Dec. 14, 1937. A. H. STOW Re. 20,591

SIDEWISE DUMPING MINE CAR AND THE LIKE

Original Filed April 21, 1924 7 Sheets-Sheet 1

WITNESSES:
C. B. Wilson
M. B. Campbell

INVENTOR
Hadley Hart Stow

Dec. 14, 1937. A. H. STOW Re. 20,591

SIDEWISE DUMPING MINE CAR AND THE LIKE

Original Filed April 21, 1924 7 Sheets-Sheet 2

WITNESSES:
E. B. Wilson
M. E. Campbell

INVENTOR
Hadley Hart Stow

SIDEWISE DUMPING MINE CAR AND THE LIKE

Original Filed April 21, 1924 7 Sheets-Sheet 3

WITNESSES:
E. B. Wilson
M. Earl Campbell

INVENTOR
Audley Hart Stow

Dec. 14, 1937. A. H. STOW Re. 20,591
SIDEWISE DUMPING MINE CAR AND THE LIKE
Original Filed April 21, 1924 7 Sheets-Sheet 4
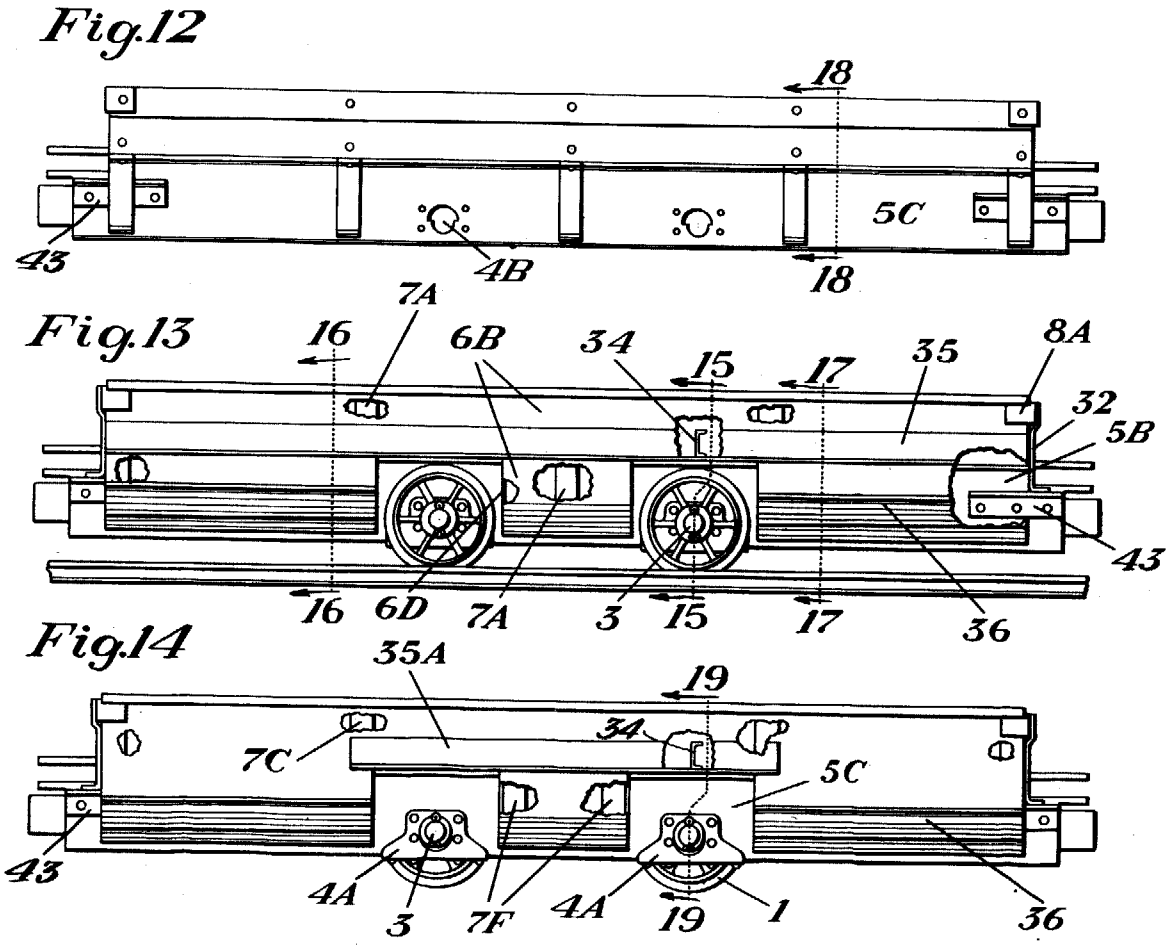
WITNESSES:
E. B. Wilson
M. Earl Campbell
INVENTOR.
Hedley Hart Stow Dec. 14, 1937. A. H. STOW Re. 20,591

SIDEWISE DUMPING MINE CAR AND THE LIKE

Original Filed April 21, 1924 7 Sheets-Sheet 5

WITNESSES:
G. B. Wilson
M. E. Campbell

INVENTOR
Hudley Hart Stow

Dec. 14, 1937. A. H. STOW Re. 20,591

SIDEWISE DUMPING MINE CAR AND THE LIKE

Original Filed April 21, 1924 7 Sheets-Sheet 6

WITNESSES:
G. B. Wilson
M. E. Campbell

INVENTOR.
Hedley Hart Stow

Dec. 14, 1937. A. H. STOW Re. 20,591
SIDEWISE DUMPING MINE CAR AND THE LIKE
Original Filed April 21, 1924 7 Sheets-Sheet 7
Fig. 23
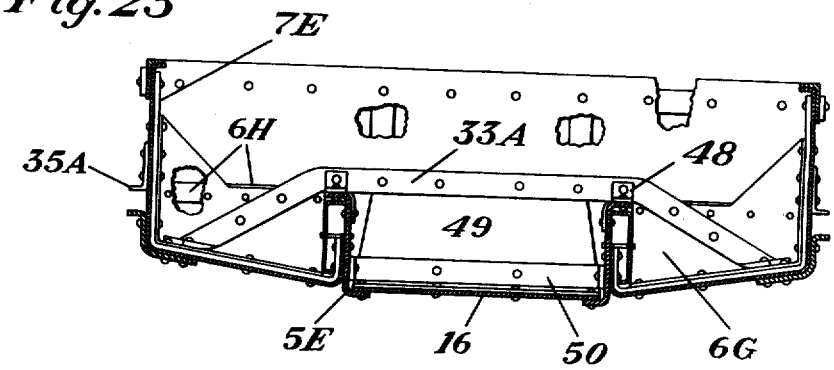
Fig. 24
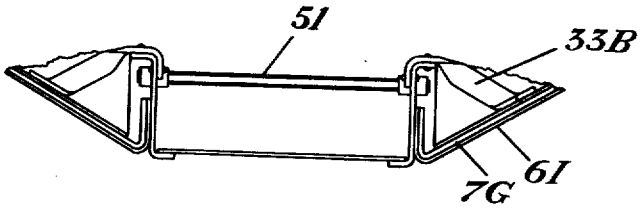
Fig. 25
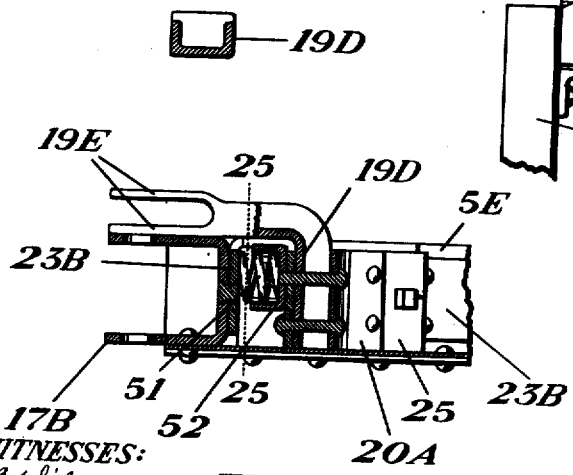
Fig. 26
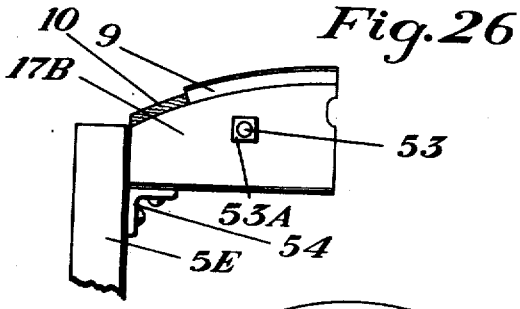
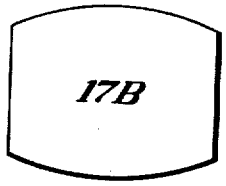
Fig. 28
WITNESSES:
G. B. Wilson
M. E. Campbell
Fig. 27
INVENTOR.
Audley Hart Stow Reissued Dec. 14, 1937

Re. 20,591

UNITED STATES PATENT OFFICE 20,591

SIDEWISE DUMPING MINE CAR AND THE LIKE

Audley Hart Stow, deceased, late of Charleston, W. Va., by Sanford Investment Co., assignee, Wilmington, Del., a corporation of Delaware Original No. 1,961,019, dated May 29, 1934, Serial No. 707,911, April 21, 1924. Application for reissue May 28, 1936, Serial No. 82,382

71 Claims. (Cl. 105—364)

This invention relates to certain improvements in and relating to sidewise dumping mine cars and the like; and the objects and nature of the invention will be readily understood by those skilled in the art in the light of the following explanation of the accompanying drawings illustrating what is now believed to be the preferred mechanical expressions or embodiments from among other forms, constructions and arrangements within the spirit and scope of the invention.

Reference is here had to the inventor's three mine car applications as follows:—#289,190, filed April 11, 1919; #424,132, filed Nov. 15, 1920; #577,172, filed July 24, 1922; also #676,326, filed Nov. 22, 1923; for Axle boxing, (now Patent No. 1,530,333, dated March 17, 1925).

Mine cars of a certain new type, in which, as viewed endwise the bottom of the lading body outside the wheels, as well as the bottom of the lading body between the car wheels, is at least in part below the plane of the car wheel axles, may for convenience be termed wing body cars or outside body cars, in order to distinguish the same from the so-called wing type car, in which only the lading body above the plane of the car wheel axles overhangs the wheels. In particular, on this basis of designation, the cars herein described, may be termed side sill supported wing body cars, or side sill supported outside body cars. In side sill supported wing body cars, that portion of the lading body outside the side sills may for convenience, be termed the outside lading body, while that between the side sills may be called the inside lading body.

Cars that are emptied of their lading by being turned over side wise, with a cradle dump, are commonly called side wise dumping cars, or cradle dump cars, and with cars of this type, wings of greatly increased capacity can be readily, economically and effectively supported by wing supporting cross beams or trusses or their equivalents, attached to and supported by the longitudinal supporting side sills, of the car, whereby in addition, in conjunction with outside longitudinal members, connecting the cross beams or sills, the car may be emptied of its lading, without injury to the relatively light and flimsy lading holding body.

A still further object is to provide an end sill arrangement, which not only is good for the heaviest service, but which also readily admits of both easily removable spring bumpers and easily removable spring draw-bars or draw-heads, in order thereby, that the bumpers and draw-bars may be quickly replaced, while the life of the larger capacity cars made practical by this design, may be materially increased.

A still further object of the invention is to provide certain improvements in features of construction, combinations and arrangements with the end in view of producing a highly advantageous mine car or other car, as will be more fully and particularly set forth and pointed out hereinafter.

Referring to the accompanying drawings:

Fig. 12 shows a side view of the wheel truck and lading body of a side sill supported wing type mine car similar to that shown in Fig. 1, but with the wings supported somewhat differently.

Fig. 13 shows a side view of a side sill supported mine car having cross beam supported wings.

Fig. 14 shows a side view of a car similar to that shown in Fig. 13, except that the supporting side sills are outside the wheels.

Fig. 23 is a view similar to Fig. 18, showing variations in details of construction.

Fig. 24 is a diagrammatical view also showing variations in details of the outside lading body supports.

Fig. 25 is a section along the dotted line 25—25, Fig. 27, of the cast steel draw-bar.

Fig. 26 is a view similar to Fig. 3, of half of another form of end sill construction.

Fig. 27 is a view similar to Fig. 4, of the form of end sill construction shown in Fig. 26, but with cast steel spring draw-bar and other parts in working position.

Fig. 28 is a plan showing the blank out of which the special channel end sill Fig. 26, is made.

Figure 1:
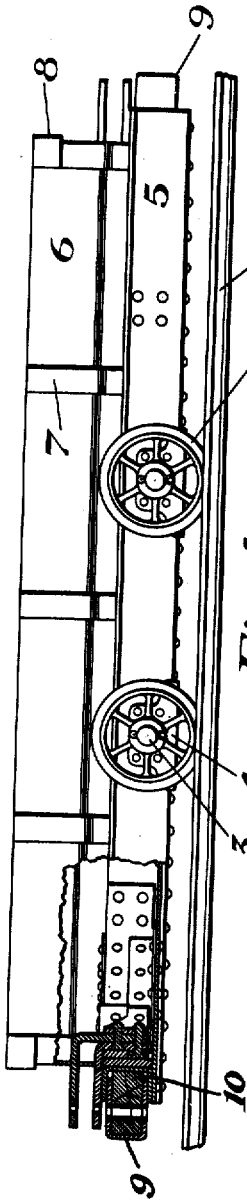
Fig. 1 is a side view of one form of side sill supported wing type mine car, the left lower corner, as shown, being broken away exposing a section along the dotted line 1—1, Fig. 2.

As shown in Fig. 1, the wheels 1, running on the rails 2, support the rotary car axles 3, the axles in turn supporting the axle boxings 4, while the boxings support the car side sills 5. The relatively light and flimsy lading holding body 6, may be of either sheet metal or of wood, and may be retained in its proper working position with respect to the side sills, by the flat strap irons 7, which may be termed the belts or binders, the terms applied to similar flat iron straps used for similar purposes in the old type mine cars. Across the ends of the car, there are commonly two horizontal flat iron braces 8, one on each end, see also Fig. 2.

*Bumpers*

Figure 3:
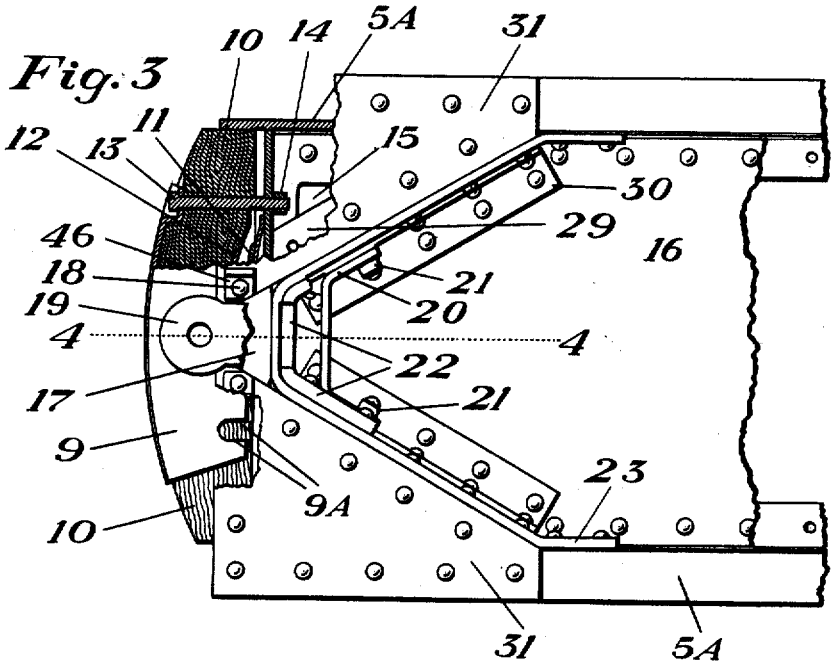
Fig. 3 is a top view of the wheel truck, similar to that in Fig. 2, but on a larger scale, part being broken away, so as to expose a partial section along the dotted line 3—3, Fig. 4, other parts being also broken away.
Figure 4:
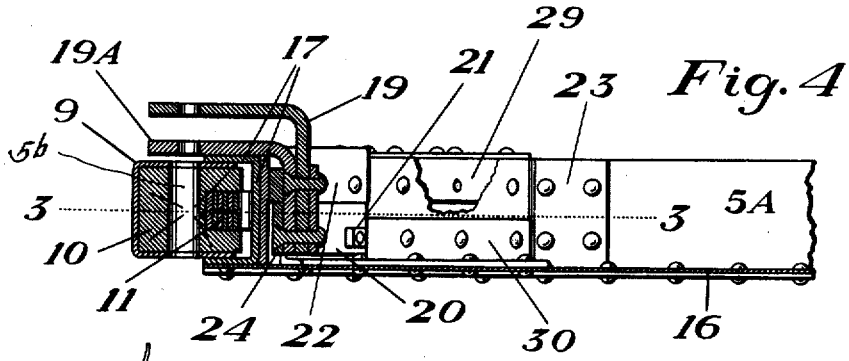
Fig. 4 is a section along the dotted line 4—4, Fig. 3.
Figure 5:
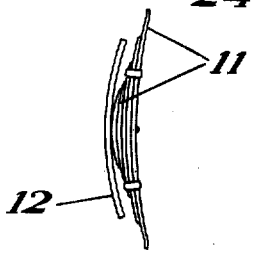
Fig. 5 is a top view of the bumper spring, with its face plate, shown in section in Figs. 3 and 4.

The car, as shown in Figs. 3 and 4, has the spring bumper consisting of the bumper face plate 9, the transverse bumper block 10, of wood, the fibres or grain of which, are at least approximately, at right angles to the side sills, the bumper spring 11, a leaf spring, see Fig. 5, and the spring face plate 12.

The bumper bolts 13, Fig. 3, one on either side, may hold the bumper face plate, the bumper block, the bumper spring, and the spring face plate, all in working position. By unscrewing the bumper bolt nuts 14, access to which may be had through the aperture 15, in the bottom plate 16, of the car, the entire bumper may be removed for examination, repair or renewal in whole or in part.

The improved bumper face plate 9, Figs. 3 and 4, formed up out of a sheet metal blank, is in cross section horizontal U-shaped, as in Fig. 4, while its upper and lower inner edges have the rivet slots 9A, to permit the face plate to slide longitudinally of the car, within the bumper receiving recess formed by the pressed end channel 17, without the rivets 18, being countersunk on the inner side.

Figure 29:
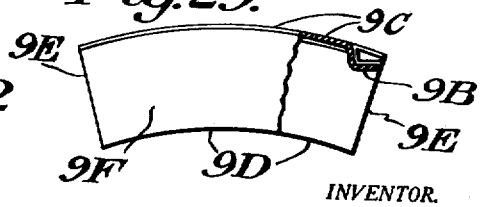
Fig. 29 is a top view, with part broken away, of the improved bumper face plate, when first formed up.

The improved bumper face plate, when first formed up, has the bolt holding seat 9B, Fig. 29, the outer curved face 9C, parallel curved inner edges, 9D, and the radial ends 9E. Except for the bolt holding seats, this is substantially the old style center bumper plate 9F, in use for many years, and usually formed up out of the rectangular sheet metal blank 9G. Evidently, it now only remains to shear the inner edges, and to punch the rivet slots and bolt holes, as shown in Figs. 3 and 8.

The bumper block 10, Figs. 3 and 4, consists of a transverse wooden beam, the ends of which abut against the vertical inner sides of the Z-bar side sills 5A. The grain of the wood is at least approximately parallel with the end beam channel 17, so that the bumper shock is at right angles to the grain of the wood.

The vertical side of the bumper block next the end channel, is hollowed out to receive the bumper spring face plate 12, and the bumper spring 11, (Fig. 5), the object of the spring face plate, being to prevent the spring from cutting into the bumper block. Before the spring is entirely flattened out, the wood block comes to a bearing against the end channel, thus cushioning the final impact.

Figure 8:
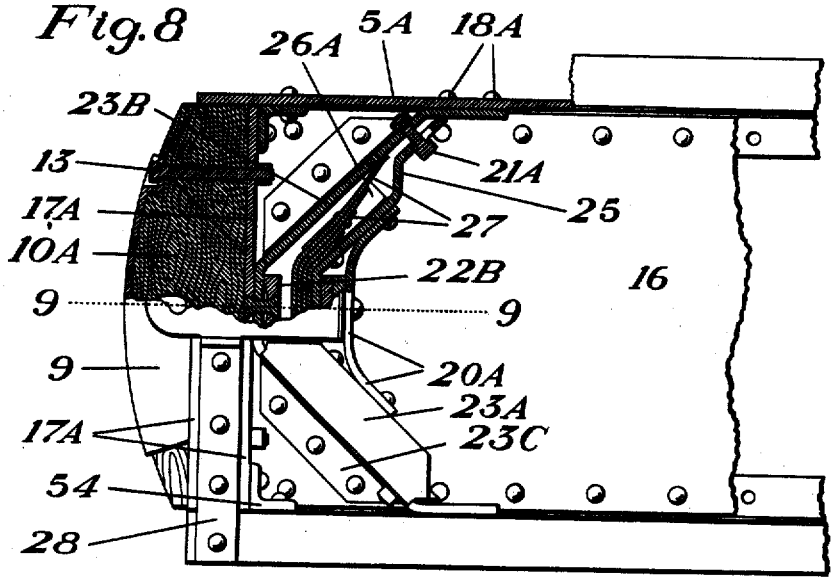
Fig. 8 is a view similar to Fig. 3, showing a section along the dotted line 8—8, Fig. 9, which is a modification.
Figure 9:
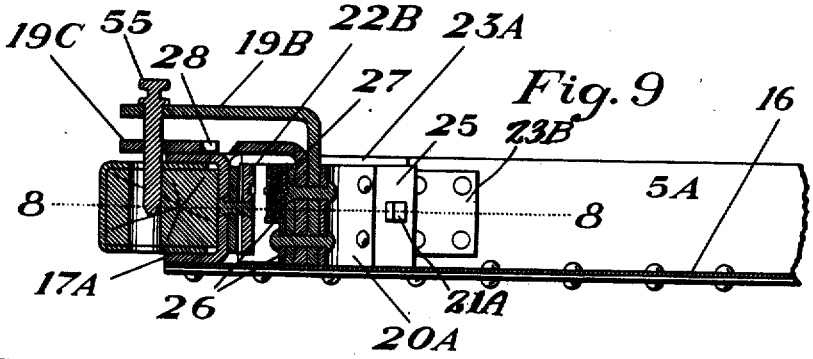
Fig. 9 is a section along the dotted line 9—9, Fig. 8.

If the bumper spring 11, and its face plate 12, Figs. 3, 4, and 5, be omitted, and the bumper block 10, replaced by the also transverse wooden bumper block 10A, Figs. 8 and 9, wide enough, as it appears in Fig. 9, to be held by the bolts 13, against the vertical member of the end channel 17A, as shown, Figs. 8 and 9, there will thus be provided a solid springless bumper, which nevertheless (being wood) is also cushioning in its action. Some varieties of wood are slightly compressive or somewhat spongy, across the grain, so that this improved springless bumper may still be cushioning in its action, in that it cushions the compressive haulage shocks, which otherwise tend to loosen the end sill riveting, and thus shorten the life of the equipment.

*Draw-bars*

Figure 6:
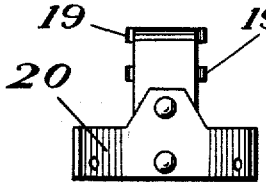
Fig. 6 is a rear view of one form of the improved removable draw-bar, with its attached reaction plate.
Figure 7:
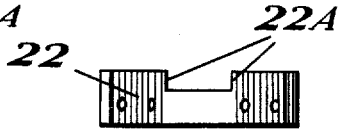
Fig. 7 is also a rear view of one form of shock plate, that shown in Figs. 1 to 4 inclusive.

The form of readily detachable draw-bars shown in Figs. 3, 4, and 6, consist of the upper draw-bar 19, and the lower draw-bar 19A. The reaction plate 20, is riveted or bolted to the rear vertical face of the upper draw-bar, as shown, and is held in place by the nuts 21. The shock plate 22, is permanently riveted to the upper inner faces of the main double diagonal end beam member 23. The draw-bar slot or notch 22A, Fig. 7, in the shock plate, engages the lower draw-bar, and assists in keeping the draw-bars from swinging side ways, while a trip of cars is being pulled around a curve, although the two nuts 21 are in a position to take care of this reaction, without other assistance.

The shock plate however, prevents the abrasion of the main double diagonal end sill bracing member 23.

The reaction plate 20, Fig. 4, is just below the shock plate 22, so that the reaction plate is held down by the shock plate. The stop block 24, riveted to the front face of the lower draw-bar, also rests against the under side of the shock plate, and also serves to hold the draw-bars in their correct positions, so that the draw-bar slot 22A, Fig. 7, may be omitted.

Removing the nuts 21, Fig. 3, with their bolts, access to which may be had through the aperture 15, will permit the withdrawal toward the right, as shown, of the entire draw-bar structure. The removal of the old type draw-bars, when broken, is a matter of some difficulty.

As the tractive and compressive haulage shocks are at least approximately, on the average, something like equal in amount, spring draw-bars are quite necessary as spring bumpers, in order to attain the maximum length of life, of equipment.

The spring draw-bar shown in Figs. 8 and 9, is of substantially the same general construction. The reaction plate 20A, is riveted to the right face, as shown, of the vertical part of the top draw-bar 19B, the slide plate 25, which also serves as a dust excluder, being riveted to the left face, as shown, of the vertical part of the lower draw-bar 19C, the spring bracket 26, being in turn riveted to the lower part of the slide plate so as to support the leaf spring 27, in working position.

The upper horizontal part of the spring bracket may evidently be made long and heavy enough to take the final impact, before the leaf spring is fully flattened out. The ends of the leaf spring may be supported by similar brackets 26A, also riveted to the slide plate.

As shown in Fig. 8, the draw-bar leaf spring has its two ends bent backwardly, to the right, as shown, at an angle of approximately 45 degrees with the central portion which is parallel to the pressed channel end beam member 17A. The ends of the leaf spring bear against the vertical faces of the special Z-bar 23A, which forms the center support for the end pressed channel which forms the bumper receiver.

As in the case of the rigid draw-bar, by removing the bolts 21A, Fig. 8, the entire draw-bar with its spring, may be withdrawn, to the right, as shown. The outward ends of the slide plate are slotted to receive the bolts 21A, so as to permit the necessary sliding motion of the spring draw-bar, as shown.

The upper edge of the slide plate 25, Fig. 9, bears against the under side of the upper flange 23A, of the special Z-bar 23B, (Figs. 10 and 11), while the lower edge of the slide plate bears against the upper face of the plate 16 which forms the lading bottom. The horizontal portion of the lower draw-bar 19C rests on the upper flange of the end channel 17A. By these two means, the sliding motion of the draw-bar is maintained parallel to the action of its spring, and in line with the tractive haulage strains.

The shock plate 22B shown in Figs. 8 and 9, is a block riveted to the center portion of the special Z-bar and to the end channel, thus binding them all together.

The side rivets 18A, Fig. 8, which holds the ends of the Z-bar to the side sills, should be counter-sunk on the inner side, to permit the insertion and action of the slide plate.

As with the rigid draw-bar, what is termed the clevis coupling may be used with the upper draw-bar, in which case also, enough of the lower draw-bar, to maintain a bearing against the upper flange of the end channel, will be of advantage. A guide plate 28, Fig. 8, with upturned edge bearing against the lower draw-bar, will also serve to maintain the draw-bar in its correct position, going around curves.

Evidently, the several parts of the draw-bars may also be welded or otherwise suitably attached, or shaped, or made in whole or in part, of cast steel or other metal.

*Double diagonal end beams*

The plain bumper and the spring bumper, as well as both the rigid draw-bar and the spring draw-bar shown herein, are at least along the lines of the similar parts, in the three mine car applications #289,190, #424,132, #577,172, above noted. The double diagonal end beam shown in Figs. 3 and 4, is also rather closely along the line of a similar end beam shown in the last mentioned application, #577,172.

What may be termed the main reinforcing element of the double diagonal end beam shown in Figs. 1, 2, 3, and 4, is the double diagonal or special web plate 23.

This special web plate, integral throughout its length, as shown, is riveted at both ends, to the vertical members of the side sills 5, from which points of attachment, the web plate extends in straight lines, diagonally toward the end channel 17, so as to meet the end channel closely on either side of the draw-bar 19. This web plate is stiffened against buckling, between the side and end sills, by the upper structural angle 29, and by the lower structural angle 30, which latter is in turn riveted to the car bottom 16, while the upper angle is in turn riveted to the gusset plate 31, the gusset plate being also riveted to the upper flange of the side sills 5A, and to the upper flange of the end channels. This form of end beam can evidently be made good for the heaviest service.

A considerable economy in riveting and material may be obtained, by the use of the special or partially flanged web plate 23B, Figs. 8 and 9, which takes the place of the special web plate 23, the upper angle 29, and the lower angle 30, above described. Leaving off the gusset plate 31, gives more ready access to the bumper bolts 13, as well as to the draw-bar bolts 21 or 21A.

Figure 10:
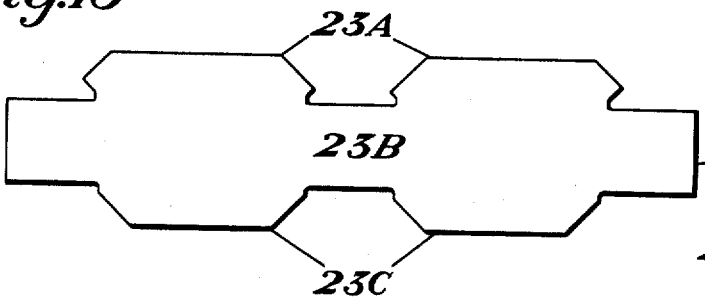
Fig. 10 shows the blank out of which is formed the special Z-bar double diagonal end beam brace.
Figure 11:
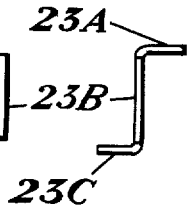
Fig. 11 shows an end view of the special Z-bar blank after the first operation of bending.

This partially flanged web plate 23B, may be first formed out of the sheet metal blank 23B, Fig. 10, so that in end view, it will have the Z-bar form, see Fig. 11, the upper portions 23A, of the blank 23B, forming the upper flanges, the lower portion 23C, of the blank, forming the lower flanges. When the web plate has thus been flanged, its further bending so as to form the double diagonal end sill brace, as shown in Fig. 8, will occur in its unflanged portions, which is a relatively simple and inexpensive operation.

This partially flanged double diagonal web plate may also be termed a partially flanged Z-bar, or a special Z-bar, and can also evidently be made good for the heaviest service.

When the haulage motor is slowed down so as to quickly stop a trip of cars without the use of the car brakes, the end sill members will evidently be subjected to compressive haulage strains, in which case, the bumper plate 9, the bumper block 10, and the end channel 17, Figs. 3 and 4, bear against the double diagonal end sill member 23, in the center. When the trip of cars is being started from rest, the double diagonal end sill member, owing to the position of the draw-bars, 19, 19A, is again obviously adapted to take care of the tractive haulage strains, so that the side channels may be so proportioned more particularly to substantially connect the end sills, to support the lading bottom at the ends of the car, and to serve as bumper receiving elements. The use of the double diagonal end sill reinforcements, in order to transmit to the side sills, the compressive and tractive haulage strains obviates the use of end channels, or of equivalent constructions, of relatively great depths or widths of flanges, which are objectionable, as liable to vertical displacement under heavy haulage shocks.

With the upper flanges 23A, of this special web plate turned away from the bumper 9, Fig. 8, these upper flanges with the web portion 23B, may thus serve as the housing for the draw-bar spring which is again of no small advantage. With this arrangement, the extra cost of spring draw-bars as compared with rigid draw-bars, is very little more than the extra cost of the springs themselves.

This also applies to the spring bumpers as compared with the rigid bumpers heretofore in use. The increase in weight, in either case, is also almost only that of the springs.

If the form of special Z-bar shown in Fig. 8, be simply turned upside down, what were the upper flanges 23A, can then evidently be readily riveted to the bottom plate 16, while what were the bottom flanges 23C, will then be in just the right position to be riveted to gusset plates similar to the gusset plates 31, Fig. 3.

The angle which the end beam diagonals make with the side sills, may evidently be varied within considerable limits.

The end channels 17, Figs. 3 and 4, may simply bear against the double diagonal web members 23, at their centers, but without being riveted to the same, as shown. The riveting of the end channels, to the double diagonal web members, as in Figs. 8 and 9, will however, bind together better, the end sill structure.

*Wing support*

Figure 16:
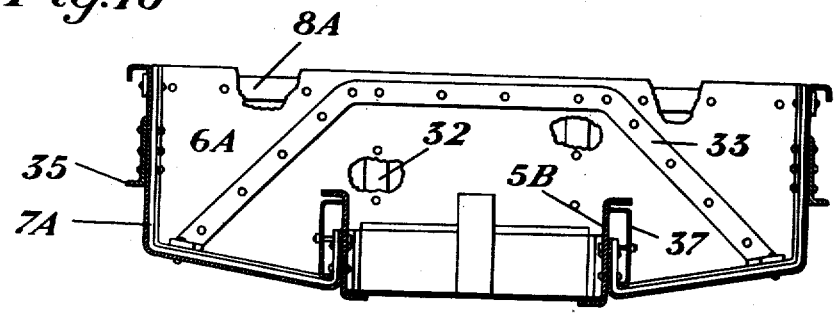
Fig. 16 is a section along the dotted line 16—16, Fig. 13, also looking toward the left, as shown.

In addition to the horizontal end brace 8A, Figs. 13 and 16, for example, the two vertical end braces 32, riveted to the horizontal end braces, and resting on some suitable support, have been in common use. This method of end support answers well enough, where the wings are of relatively shallow depth, as in Fig. 18, but where the wings are of approximately the same depth as the remainder of this new type of car, as in Fig. 16, some additional means of end support will be required.

This may to advantage be the vertical double inclined end brace 33, riveted along its upper horizontal central portion, through the lading body end sheet 6A, to both the horizontal and vertical end braces, as shown, as well as riveted or otherwise suitably attached to the end belts 7A, at their outer ends as shown.

The distance between the axles is commonly, at least approximately, about one-third of the lading body length, so that over axles 3, Fig. 13, will be a suitable place for the wing supporting cross channels or beams, 34. Over the axles is however a suitable place for the cross channels or beams, for other reasons, which will appear further on.

In order to permit, for example, the ready replacement of car wheels that may be broken, without the necessity of first removing the car wheel axles, it is of advantage to have the lower part of the wings 6B, Fig. 13, recessed just sufficiently for this purpose. When the cars become derailed, it is also of advantage to be able to get at the rails where the car wheels should bear on the same, these wheel recesses also serving this second purpose. The tops of these wheel recesses, also herein termed the wheel housings, will also require support, so that over the axles is again a suitable location for one set of wing supports.

Figure 15:
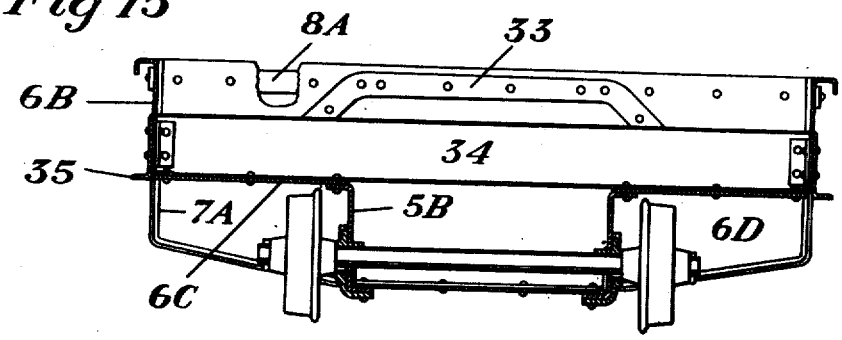
Fig. 15 is a section along the zig-zag dotted line 15—15, Fig. 13, looking toward the left, as shown.

As shown in Fig. 15, the wing and wheel recess supporting cross channel or beam 34, rests on and is riveted to the upper flanges of the Z-bar supporting side sills 5B, its ends being riveted to the lading siding 6B, and to the structural angle side brace 35, which latter is in turn riveted to the belts 7A.

The lading siding 6C, over the wheels, also herein termed the wheel housing cover plates, may evidently be riveted to the under side of the cross channel, the inner edges of this lading siding resting conveniently upon the upper flanges of the longitudinal side sills, under the cross channels, as shown. This cross channel is evidently but an extension of the same principle to the wing body support, as the longitudinal supporting side sills bear to the main car body.

Figure 17:
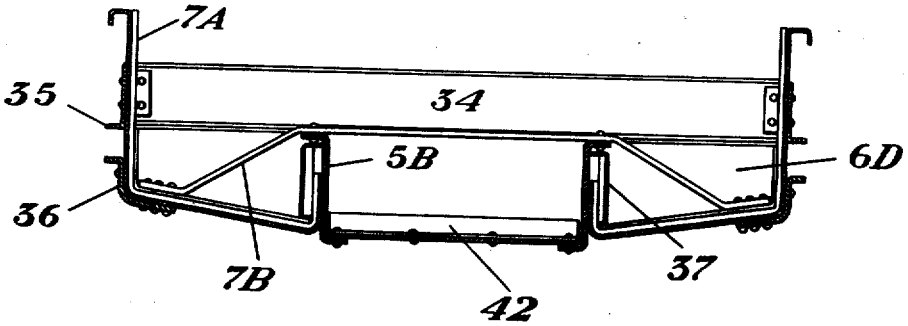
Fig. 17 is a section along the dotted line 17—17, Fig. 13, similar to Fig. 16.

In combination with the main belts 7A, Fig. 17, may be used the double inclined belt braces, 7B, the central horizontal portion of which rests on the Z-bar side sills 5B, from which points the belt braces slope downwardly to meet the outer portion of the main belts which support the sloping wing bottoms, being there riveted to same, as shown. This combination makes what is known as a truss, and may be made amply strong for the purpose, at a relatively small cost. At the lower outside corner of the wings, may be riveted what may be termed special angles 36, conforming to the shape of the corner, as shown, and flanged at their top edges, and protecting the corner against abrasion. These special angles will serve admirably for engagement with the cradle dump, as the dumping strains will thus be delivered to the supporting side sills.

In much the same way, however, the side bracing channels 35, Fig. 17, will also serve, admirably, for engagement with the cradle dump, as they will also deliver to the side sills, the dumping trains, the side sills in turn delivering the dumping strains to the several belts, and thus without material strain on the relatively light and flimsy lading holding body, at any one point particularly.

For the longer cars now in use, five belts 7A, Fig. 13, will be a convenient number, which may be arranged, as shown. In this case, the four special angles 36, two on either side of the car, are connected with the two pairs of end belts. This will give the cradle dump a connection with the side sills, by means of two belt trusses and the two car end plate trusses, amply sufficient for the purpose.

Where the service is severe, evidently the belt truss shown in Fig. 17 may also be used in connection with the end plate truss shown in Fig. 16, while the wing supporting channels may be used in place of the belt trusses, also in connection with the end plate trusses. Plate trusses may also evidently replace either the belt trusses or the wing supporting channels.

The side bracing angle 35, Figs. 15 and 16 as well as 17, may extend the whole length of the car, see also Fig. 13. The special function, however, of this angle, is to keep the vertical sides of the wings, in the middle of the car, from bulging outward; these angles being kept from spreading themselves by means of the wing supporting channels 34, herein also termed cantilevers. Evidently, then, the side bracing angle 35, Fig. 13, may be replaced by the shorter side bracing angle 35A, Fig. 14, attached at its ends, to, say the two belts 7C, at the farthest sides of the wheel recesses.

The right and left vertical sides of the wheel recesses, as they appear in side view, Fig. 13, may be filled in with the lading siding sheets 6D, also herein termed the wheel housing transverse siding, see also Figs. 15 and 17.

When the car is turned over side ways, to be emptied of its lading, as with the cradle dump, in order to keep lumps of coal from hanging under the upper flanges of the Z-bar side sills 5B, Figs. 16 and 17, small pressed channels 37, may be bolted underneath the said upper flanges, as shown.

Figure 18:
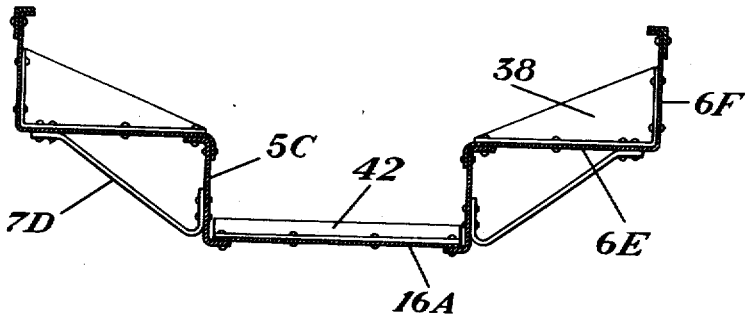
Fig. 18 shows a section along the dotted line 18—18, Fig. 12.
Figure 19:
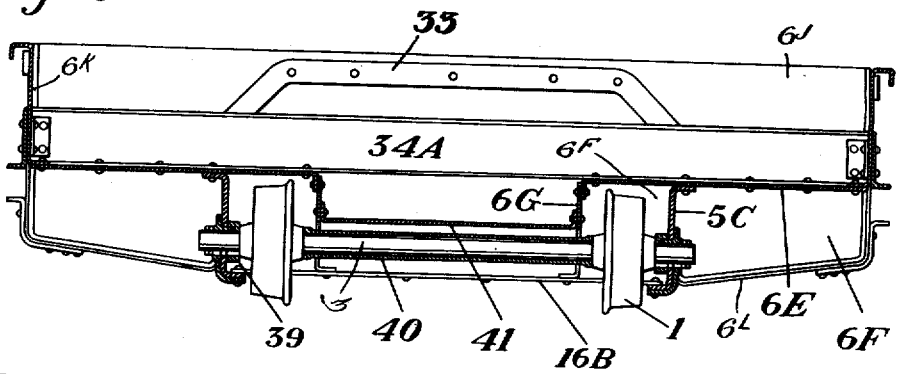
Fig. 19 shows a section along the zig-zag dotted line 19—19, Fig. 14.

In addition to the greater length of car made practical by the use of supporting metal side sills, Figs. 18 and 19, illustrate, at least approximately, the relative end areas, of the type of cars heretofore proposed, and of cars that may be constructed, in a practical manner, along the lines indicated herein. These two cars are approximately, for the same gauge of track, and of the same height above rail.

Many old mines have extensive narrow gauge equipment, too expensive to replace, in order to gain mine car capacity, and yet with these narrow gauge mines, the inside lading body, that between the side sills 5C, Fig. 18, if these sills are between the wheels, will become seriously reduced. With the side sills 5C, outside the wheels 1, as in Fig. 19, the inside lading body is evidently of material capacity, while for a given overall width of car, the overhang of the wings is materially reduced.

As shown in Fig. 18, the horizontal lading siding sheets 6E, are attached along their inner edges to the top flanges of the Z-bar side sills 5C, while the outer portions are supported by the short belts 7D, the vertical parts 6F, of the siding being maintained vertical by the gusset plates 38.

The general construction of the car shown in Fig. 19, is along the lines of the Fig. 13 car, except more particularly that the side sills 5C are placed outside the wheels 1, see also Fig. 14, which has the same style wheel recesses as the Fig. 13 car. The axle boxings 4A may still be placed on the outside of the side sills, with suitable wheel bearing washers 39, placed on the inner ends of the axle bearings, the loose axle tube 40, with chilled bearing faces on the ends, maintaining the wheels the proper distance apart.

The wheel housings include both vertical and horizontal siding sheets or plates. As shown in Fig. 19, the wheel housing may be said to consist of the wheel housing cover plate 6E, supported by the cross channel 34A, the transverse siding plates 6F, in two sections, one on either side of the side beam 5C, and both supported by the said cover plate, together with the longitudinal siding plates 6G, also supported by the said cover plate. The above described housing 6E, 6G, may be said to be transverse to the said side beams, whereas the wheel housing 6C, 6D, Fig. 15, may be said to be extended from the said side beams.

The wheel housing 6C, 6D, Fig. 15, may also be said to be an external wheel housing for the still further reason that ready access, transversely of the car, may be had through the aperture in the lading siding proper 6B, to the interior of the said wheel housing.

Figure 2:
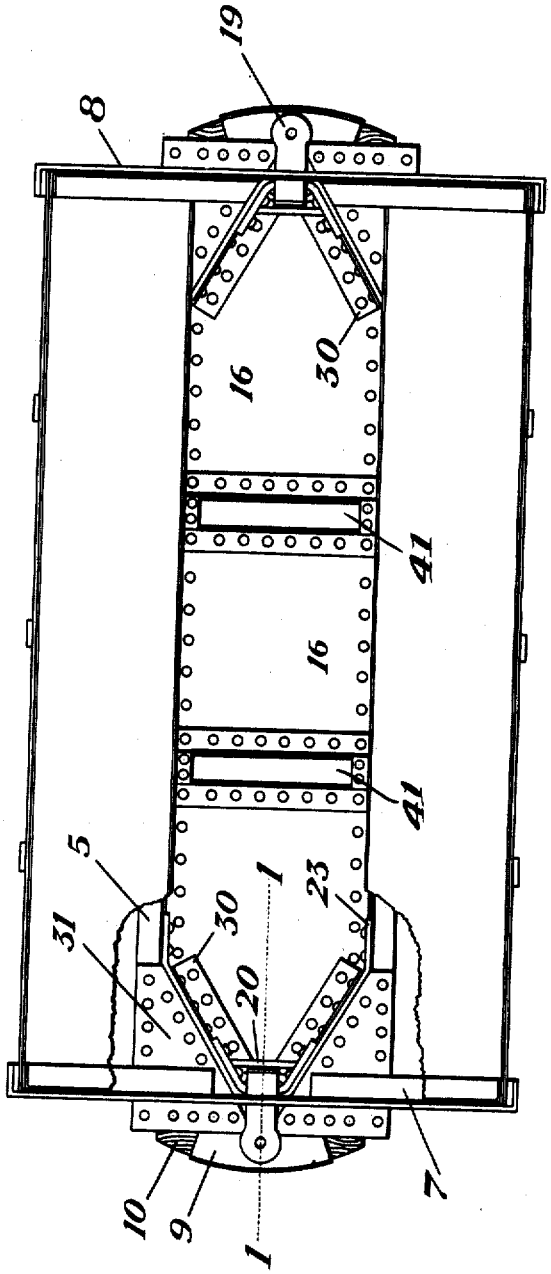
Fig. 2 is a top view of the car shown in Fig. 1, a portion of the lading holding body being broken away, exposing a top view of the left end, as shown, of the wheel or traction truck.

The axle may also have an inverted U-shaped housing 41, Figs. 2 and 19.

The car bottom 16A, Figs. 17 and 18, may be supported between the side sills 5C by the angle iron 42, the ends of which rest over the lower flanges of the side sills. The car bottom 16B, Fig. 19, may evidently be supported in a similar way.

The angle 42 also serves another useful purpose, in that it stiffens the car bottom so that the lower parts of the Z-bar side sills 5C, Fig. 18, will not be forced in toward each other by the weight of the wings, transmitted through the belts 7D.

*Side sills*

The side sills 5, also herein termed the side beams, Fig. 1, and the end channels 17, Figs. 3 and 4, may to advantage be extended as near the ends of the bumper 9, as practical, in order to minimize undesirable vertical play in the bumpers. The bumpers are, however, used by the miners to stand on, often enough, while the cars are in motion, so that the relatively high side sill 5C, Fig. 14, for instance, may to advantage be cut down at the ends, see Fig. 20, as much as practical. For this purpose, an angle iron 43 may be riveted to the side sill, see also Fig. 21, in part, so as to also widen the end structure. This angle may also serve for the attachment of a wood standing plate 44, say of the same general ground plan as the bumper. This side sill 5C, Fig. 21, may be termed a triple flanged side sill or side beam, also herein termed a beam provided with end triple flanges spaced apart.

Figure 20:
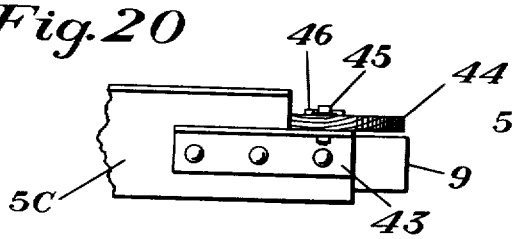
Fig. 20 shows a side view of the right end, as shown, of the supporting side sill shown in Fig. 14.
Figure 21:
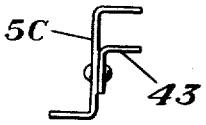
Fig. 21 shows an end view of the Z-bar side sill shown in Fig. 14.
Figure 30:
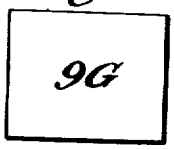
Fig. 30 is a top view of the sheet metal blank out of which the improved bumper face plate is formed up.

These standing plates, herein also termed transverse standing plates as being transverse of the car, and also herein termed end sill coverings, one on either side of the draw-bars, may be held, at their outer ends, by bolts 45, Fig. 20, through the angle iron 43, while their inner ends, next the draw-bars, may be held in place by the small bracket plates 46, see also Fig. 3, held in place by the rivet 18. The miners' shoes, usually shod with nails, will less readily slip off the wood standing plates, than off the metal end structure.

The end guides or tie plates 28, Fig. 8, may be riveted to the angle 43, and to the end sill upper flanges, as shown, in order to bind together the side and end sills, just as the lading bottom 16 binds together the end sill lower flanges, and the side sills.

*Variations*

Figure 22:
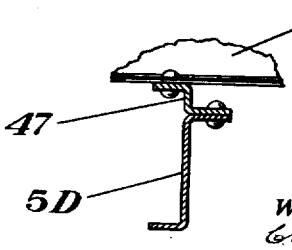
Fig. 22 shows a section of the side sill, with cross sill connection.

When it is desired to have the bottom of the wing body supporting cross channels 34B, Fig. 22, say slightly higher than the tops of the side sills 5D, any sort of a filler, such as the pressed Z-bar 47, may be used.

For the purpose of illustration, the channel has been selected as typical of metal beams that may be used for wing support, but the channel may be replaced by any of the well known equivalents, for this purpose. This also applies to the structural angles, plate or flat metal trusses, and gusset plates shown, all of which may be used interchangeably, insofar as it is consistent with good practice.

In Fig. 23, the vertical sides 6G, of the wheel housings, herein also termed lading wing supporting wheel housings, are extended upwardly and outwardly, near their ends, in the form of triangles, similar to the gusset plates 38, Fig. 18, so as to brace the upper parts of the belts 7E, against being forced outward by the lading. A double inclined brace 33A, made of flat iron on edge, similar to the end wing brace 33, Fig. 16, rests at either end of the horizontal central portion, on the tops of the side sills 5E, being attached to their upper flanges, by means of the clips 48. The lower outer ends of these wing braces are riveted to the outer sloping parts of the belts 7E, while the intermediate portions are riveted to the vertical side plates 6G. The top sheets 6H may have their side edges turned down so as to be riveted to the vertical sides 6G, while their inner edges may be turned down over the top flanges of the side sills and riveted to the same.

Evidently, in the manner described, the wheel housings may thus serve as an economical and efficient means of wing support.

A vertical plate 49, Fig. 23, may connect the car bottom 16 and the wing brace 33A, in part to support the bottom, and in part to stiffen the wing brace from being bent down near the center by heavy pieces of lading. This plate will also stiffen against buckling, the flat strap strut 50, which latter keeps the lower parts of the side sills from being forced inward by the weight of the wings and lading, independently of the lading bottom rivets.

The side stiffening angle 35A, Fig. 23, extends from the right vertical side, as shown, of the right wheel recess, Fig. 14, to the left vertical side of the left wheel recess. Therefore, there may be only two of the double diagonal wing supports, 33A, between the two ends of the car, one at either end of the side stiffening angles. This will reduce the number of obstructions to the lading within the traction truck proper. Where the double diagonal wing braces or supports, 33A, are used between the ends of the car, it will reduce the number of different parts in the car, to also use this form in place of the end brace 33, see Fig. 16.

In the application #424,132, filed Nov. 15, 1920, short inclined or sloping wing body supporting braces, similar to the short braces 33B, Fig. 24, were disclosed, but without the tie rod 5I, which may be over the car axles. The outside lading body double inclined cross braces 33A, Fig. 23, which as shown, are continuous from end to end, may be termed outside lading body double inclined cross braces, in order to distinguish the same from the short sectional inclined cross braces previously disclosed.

With the double inclined cross braces 33A, the weight of the outside lading body, on one side of the truck, is balanced by the weight of the outside lading body on the other side of the truck.

The double inclined cross braces 33, Fig. 15, and 33A, Fig. 23, as being transverse of the car, will also be herein designated as transverse integral double inclined supporting members. Somewhat similarly, the cross channels 34, Fig. 15, and 34A, Fig. 19, will also be herein designated as transverse supporting beams, and again also as transverse supporting members, which term also obviously includes the cross braces 33, 33A, as above. Again, somewhat similarly, the lading end closure 6A, Fig. 16, is obviously reinforced by the double diagonal cross brace 33, and will therefore be also herein designated as a diagonally reinforced lading end closure. Again, somewhat similarly, the lading siding proper 6B, Fig. 13, is reinforced by the horizontal angle 35, and will therefore be also herein designated as horizontally reinforced lading siding.

For cradle dump cars, the wing supporting cross channel 34, Fig. 15, for instance, may be a built up channel or angle, of greater depth than shown, until for instance, its top is level with the top of the car, in which case, the car may be considered as consisting of three separate compartments.

Instead of the one belt 7A, Fig. 13, there may for example be two belts 7F, Fig. 14, between the wheel recesses, one closely adjacent to either of the two adjacent vertical faces of the wheel housings.

The lading siding 6, Figs. 1 and 2, may be put inside the belts, but putting the siding outside the belts, as shown herein, gives something of a gain in capacity without increase in cost.

The cast steel draw-bar 19D, Figs. 25 and 27, may evidently replace the two wrought draw-bars 19B and 19C, Figs. 8 and 9, for example, which latter may also be welded or otherwise suitably united, for the purpose.

As shown in Figs. 25 and 27, the cast steel draw-bar 19D, may be said to consist of the vertical downwardly extending channel-shape shank 19D, and the horizontal draw-head proper 19E; the side plate 25, and the reaction plate 20A, being riveted to the rear and front of the vertical part of the draw-bar shank, as shown. The spiral spring 51, with its seat 52, may evidently replace the leaf spring 27 of Figs. 8 and 9.

The pressed end channels 17, Fig. 4, and 17A, Fig. 9, etc., may also evidently be replaced by equivalent forms, as for example, by the special channel 17B, Figs. 26, 27, and 28, formed up out of the sheet metal blank 17B, Fig. 28, in a manner similar to that in which the double diagonal end brace 23B, Fig. 8, was formed.

What appear as the horizontal flanges of the end channel 17B, Fig. 27, may have an outside edge, which when viewed from the top, as in Fig. 26, is the sector of a circle, and thus approximately parallel to the adjacent and outer edge or face of the bumper face plate 9, and of the bumper block 10. The bumper vertical bolts 53, held in place by their nuts 53A, are passed, as shown, through the end channel, the bumper face plate and bumper block, as one method of retaining the bumper face plate and bumper block, in working position. The structural angle 54 may be riveted to the vertical sides of both the side and end sills, at their junction, as in Fig. 8, to secure them together.

The bumper leaf spring 11, Figs. 3, 4, and 5, also herein termed the bumper transverse leaf spring, as being transverse of the car, may also be replaced by other forms of springs suitable for the purpose.

The outside lading supporting cross channel 34, may replace the double inclined end braces 33, Fig. 16.

The angle which the bottom part or nearly horizontal portion of the belt 7A, Fig. 16, makes with the web plate of the side sill 5B may be varied within considerable limits. If this angle is made 90 degrees, or a right angle, the car then becomes, in end view, a rectangular or box car. As shown in Fig. 24, the bottom portions of the belt 7G, with the attached lading siding 6I, may also be made more sloping toward the center of the car, than as shown in Fig. 23, and elsewhere.

As shown in Fig. 13, the lading holding body is also approximately rectangular in side view, while the said lading holding body shown in Fig. 15 may also be said to be approximately rectangular in end view, more particularly insofar as lading capacity is concerned. The term rectangular lading holding bodies is therefore to be understood to include lading holding bodies which are approximately rectangular, both transversely and longitudinally of the car.

The boxings 4, Fig. 1, and 4A, Fig. 14, may be said to be integral side sill reinforcing axle boxings, to compensate for the metal removed from the side sills 5C, Fig. 12, thus making the holes 4B for the insertion of the axles 3, Fig. 14, and a portion of the axle bearing proper, as per the application #676,326, filed Nov. 22, 1923, (now Patent No. 1,530,333, dated March 17, 1925.)

As shown in Fig. 19, the lading holding body, as a whole, consists more particularly of the lading end closures 6J, the lading wing lading siding proper 6K, the lading wing lading bottoms 6L, and the traction truck lading bottom 16B. All of the said lading bottoms are below the plane of the tops of the car wheel axles 3. Any lading bottoms, therefore, which are below the plane of the tops of the car wheel axles, will also be herein designated as sub-axle lading bottoms. The lading sheets 6J, 6K, which overhang the side beams 5C will also be herein termed sub-axle lading wings.

Obviously, the bumper face plate 9, Figs. 3 and 4, may be of sufficient height, as it appears in Fig. 4, to extend over the upper flange of the end channel 17, as well as under the car bottom 16, instead of being within the end channel, as shown.

Any form of coupling pin may be used. The coupling pin 55, as shown in Fig. 9, headed up out of a round bar passes through the drawbars 19B, 19C, and also into the coupling pin approximately vertical receiving aperture 56, said aperture extending through both flanges of the bumper plate 9, and also through the bumper block 10, see also Fig. 4.

No broad claim to mine or other cars, with longitudinal supporting side sills is made herein, nor broadly to the double diagonal end sill bracing, nor broadly to outside lading body cars, nor broadly to integral side sill reinforcing wheeled rotary axle boxings.

In mine cars of this general type, it is desirable to place the car axles sufficiently near each other to divide the length of the car into three parts, a middle part located between the axles and an end part reaching away from each axle, whereby the space between the wheels at each side of the car is relatively limited and makes what is termed a "short wheel base". For load distribution this positioning of the axles is desirable. Producing a "short wheel base" by this positioning is also desirable, because, as already herein stated, such a car having a short wheel base can better traverse short curves in such rail tracks as are ordinarily in service at mines. Furthermore, placing these axles to form a short wheel base, removes the wheels from the ends of the car where they will not interfere with the coupling and bumper means when cars are to be connected for operation as trains or "trips". By reference to the drawings, it will be seen that in this improved car the axles and wheels are placed as above described. And this placing of the axles may be defined as placing them in upright transverse planes which are between the upright transverse middle plane of the car and the ends of the car. It is also to be observed that an upright, transverse plane between either end of the car and the adjacent wheels, and near said wheels, will cut a part of the sub-axle lading floor or bottom lying below the axle plane. Hence it is appropriate to define these wheels and axles as being grouped between two upright, transverse planes cutting portions of the sub-axle lading floor lying below the axle plane.

What is claimed is:

1. In mine and other cars, the combination of structural metal end and side sills secured together in the form of a traction truck, a lading bottom secured to the lower portions of the said end and side sills, outside lading bodies, together with outside lading body supporting internal cross beams supported by the said truck side sills.

2. In mine and other cars, the combination of structural metal end and side sills secured together in the form of a traction truck, a lading bottom secured to the lower portions of the said end and side sills, outside lading bodies, together with outside lading body supporting internal cross beams located approximately over the car axles and supported by the said truck side sills.

3. In mine and other cars, the combination of structural metal end and side sills secured together in the form of a traction truck, a lading bottom secured to the lower portions of the said end and side sills, outside lading bodies, outside lading body supporting internal cross beams supported by the said side sills, together with longitudinal outside lading body bracing members secured to said internal cross beams.

4. In mine and other cars, the combination of metal side sills having triple end flanges spaced apart, flanged metal end beams, car axles intermediate the top and bottom flanges of the side sills, together with a secured lading bottom below the plane of the car wheel axles.

5. In mine and other cars, the combination of structural metal end and side sills secured together in the form of a traction truck, car axles extending through the side sills above the lower edge portions of the latter, a lading bottom below the plane of the car wheel axles and secured to the side sills, outside lading bodies, outside lading body supporting internal cross beams supported by the side sills, together with longitudinal outside lading body bracing members secured to said internal cross beams.

6. In mine and other cars, in combination, flanged metal end beams, Z-bar side beams having end triple flanges spaced apart, car wheels, wheel housings, car axles extending through the side sills above the lower edge portions of the said side sills, together with a secured lading bottom below the plane of the car wheel axles.

7. In mine and other cars, in combination flanged metal side beams, car axles intermediate the upper and lower portions of the side beams, flanged metal end beams, flanged metal bumper face plates, bumper transverse leaf springs between said bumper face plates and said end beams, coupling pin vertical receiving apertures through the bumper face plate flanges, together with a sub-axle lading bottom.

8. In mine and other cars, in combination, flanged metal side beams, car axles intermediate the upper and lower portions of the side beams, flanged metal end beams, flanged metal bumper face plates, bumper filler members between said end beams and bumper face plates, bumper transverse leaf springs between said bumper filler members and end beams, coupling pin vertical receiving apertures through said bumper face plate flanges and through said bumper filler members, and a sub-axle lading bottom.

9. In mine and other cars, in combination, flanged metal side beams, rotary axle boxings secured to the side beams intermediate the side beam top and lower flanges, car wheels, rotary car axles in the car wheels and in the axle boxings, lading wings, transverse wing supporting members, and a sub-axle bottom rigidly secured to said side beams.

10. In a mine car, the combination of wheels, axles, longitudinal side sills supported by the axles, a sub-axle lading bottom lying between the car wheels, outside lading bodies having bottoms lying in planes that cut the adjacent wheels and said side lading bodies being provided between their ends with wheel recesses, and transverse stiff cantilever beams lying in a horizontal plane above the side sills and at least in substantial part supporting said side lading bodies in cantilever fashion.

11. In a mine car, the combination of wheels, axles, longitudinal side sills supported by the axles, a sub-axle lading bottom lying between the car wheels, outside lading bodies, and transverse stiff cantilever beams lying in a horizontal plane above the side sills and at least in substantial part supporting the said side lading bodies in cantilever fashion.

12. In a mine car, the combination of wheels, axles longitudinal side sills between the wheels and supported by the axles, a sub-axle lading bottom lying between the side sills, outside lading bodies having bottoms lying in planes that cut the adjacent wheels and the said side lading bodies being provided between their ends with wheel recesses, and transverse stiff cantilever beams lying in a horizontal plane above the longitudinal side sills and near the ends of the side sills and at least in substantial part supporting said side lading bodies in cantilever fashion.

13. In a mine car, the combination of wheels, axles, longitudinal side sills between the wheels and supported by the axles, a lading bottom lying between the side sills, outside lading bodies having bottoms lying in planes that cut the adjacent wheels and said lading bodies being provided between their ends with wheel recesses, and transverse stiff cantilever beams lying in a horizontal plane above the horizontal plane of the longitudinal side sills and said beams forming a part of the lading body end wall closure and bracing structure and said beams at least in substantial part supporting said side lading bodies in cantilever fashion.

14. In a mine car, the combination of car wheels, axles, longitudinal side sills supported by the axles, a central sub-axle lading bottom lying between the car wheels, side lading bodies, and at least one transverse cantilever beam supported by the side sills and at least in substantial part supporting the side lading bodies in cantilever fashion.

15. In mine and other cars, the combination of structural metal end and side sills secured together in the form of a traction truck, a lading bottom secured to the lower portions of the said end and side sills, together with sheet metal double diagonal end sill bracing members above the truck lading bottom and secured to the side sills, the diagonal portions of the end sill bracing members connecting the said end and side sills being provided with integral flanges.

16. In mine and similar rail cars, the combination of car wheels, car axles, longitudinal side sills supported by the axles and having substantially upright lower portions, a central lading body lying between two car wheels on one axle, side lading bodies extending outward beyond the inside flanges of the adjacent wheels and the bottoms of said side lading bodies lying in planes cutting the adjacent wheels, hood-coverings over the wheels and a transverse stiff beam member lying above the horizontal plane of the low portions of the side sills and at least in substantial part supporting one end of the said side lading bodies in cantilever fashion.

17. In mine and similar rail cars, the combination of car wheels, car axles, longitudinal side sills between the wheels and supported by the axles, a lading bottom lying between the side sills, side lading bodies extending laterally beyond the upright planes of the said side sills and the bottoms of said side lading bodies lying in planes that cut the adjacent wheels and the said lading bodies being provided between their ends with hood coverings over the wheels, a transverse stiff beam member lying above the longitudinal side sills and forming a part of the lading body end wall closing and bracing structure and extending substantially from one side of the lading body to the other and at least in substantial part supporting one end of the side lading bodies in cantilever fashion whereby the use of additional outwardly extending supports for the side lading bodies at this end of the car may be dispensed with.

18. In mine and similar rail cars, the combination of car wheels, car axles, a lading body, longitudinal side sills lying between two wheels on one axle and penetrated and supported by said axles, end sills securely connected with the side sills so as to form a traction truck frame, a central lading bottom lying at least in substantial part below the horizontal plane of the tops of the axle journals, side lading bodies extending outward laterally from approximately the upright longitudinal planes of the side sills and extending through the upright planes of the inside of the flanges of the adjacent wheels, a transverse stiff structural steel member at each end of the lading body and lying above the end sills of the traction truck frame and forming a part of the lading body end wall closure and stiffening structures and at least in major part supporting the said side lading bodies in cantilever fashion.

19. In mine and similar rail cars, the combination of car wheels, car axles, longitudinal side sills lying between two wheels on one axle and penetrated and supported by the said axles, a central lading bottom lying at least in substantial part below the horizontal plane of the tops of the axle journals, side lading bodies extending outward laterally from approximately the upright planes of the side sills, a transverse stiff flanged beam member lying at least in substantial part in a horizontal plane above the upper portions of the side sills and rigidly connected with the said side sills, and the said beam member forming at least a part of the lading body end wall stiffening structure and extending outward laterally and at least in substantial part supporting one end of the said side lading bodies in cantilever fashion.

20. In mine and similar rail cars, the combination of car wheels, car axles, a lading body, longitudinal side sills lying between two wheels on one axle, a transverse stiff beam member lying at least in substantial part above the upper portions of the side sills and engaging and rigidly fastened to the said side sills and extending substantially from one side of the lading body to the other, and the said beam member forming at least a part of the lading body end wall stiffening structure and at least in part supporting one end of the side portions of the lading body in cantilever fashion.

21. In mine and similar rail cars, the combination of car wheels, car axles, a lading body, longitudinal side sill members lying between two wheels on one axle, a stiff metal beam member lying at least in substantial part in a horizontal plane above the upper portions of the side sills and engaging and rigidly fastened to the said side sills and extending transversely substantially from one end of the end wall of the lading body to the other and forming at least a part of the lading body end wall stiffening structure and at least in part supporting one end of the side portions of the lading body in cantilever fashion, and a longitudinal lading body outside side wall stiffening beam member forming part of one of the side wall structures and extending substantially from one end of the lading body to the other and stiffening the side lading body wall structure against drooping between the ends.

22. In mine and similar rail cars, the combination of a lading body, car wheels, car axles, a central lading bottom lying between two wheels on one axle and having portions below the horizontal plane of the tops of the axle journals and also below the horizontal plane of the upper portions of the side sills, side lading bottoms extending outward laterally substantially from the upright planes of the edges of the central lading bottom whereby the lading bottom is sealed against leakage and the said side lading bottoms extending through the upright planes of the inside of the flanges of the adjacent wheels in planes cutting the said wheels and the said lading bodies being recessed between their ends for the upper parts of said wheels, together with a lading body stiffening and supporting frame composed in part of structural steel transverse cantilever members forming at least a part of the lading body end wall stiffening structure and composed in part of structural steel longitudinal members rigidly fastened with reference to the transverse end wall structure, and the said steel longitudinal members forming at least a part of the lading body side wall stiffening structure, and the said lading body stiffening frame lying above the said longitudinal side sills and secured against movement in respect of the said side sills.

23. In mine and similar rail cars, the combination of a lading body, car wheels, car axles, longitudinal side sills supported by the axles, a central lading bottom lying between two wheels on one axle and having portions below the horizontal plane of the tops of the axle journals and also below the horizontal plane of the upper portions of the side sills, side lading bottoms extending outwardly substantially from the upright planes of the edges of the central lading bottom whereby the lading bottom is sealed against leakage, and the said side lading bottoms extending through the upright planes of the inside of the flanges of the adjacent wheels in planes cutting the said wheels, wheel hood coverings, and a lading body stiffening and supporting frame composed in part of flanged steel transverse cantilever members forming at least a part of the lading body end wall stiffening structure and composed in part of flanged steel longitudinal sill members rigidly fastened with reference to the transverse end wall structures, and the said steel longitudinal sill members forming at least a part of the lading body side wall stiffening structure, and the said end transverse cantilever members resting upon the said longitudinal side sills and secured against movement in respect of them.

24. In mine and similar rail cars, the combination of car wheels, car axles, two approximately rectangular and substantially horizontal frames each including stiff metal end and side members rigidly connected at the corners, the first frame being supported by the car axles and having its longitudinal side members lying between the car wheels, and the second frame having its end transverse members resting upon and rigidly secured to and supported by the side members of the first frame, and the side members of the second frame at least in substantial part lying in upright planes exterior to the upright planes of the inside of the flanges of the adjacent wheels, a central lading bottom at least in part supported by the first frame and lying at least in substantial part below the horizontal plane of the top of the axle journals, and side lading bodies extending beyond the upright planes of the side members of the first frame and having bottoms lying in planes cutting the adjacent wheels, and the said side lading bodies being at least in substantial part supported by the members of the second frame.

25. In mine and similar rail cars, the combination of two superimposed rigid and substantially rectangular metal frames, the lower of the said frames being supported by the car axles and the two frames being of such rigidity and strength that they can without reinforcement endure substantially all the traction and load carrying strains to which the car is subjected.

26. In mine and similar rail cars, the combination of wheels, axles, two approximately rectangular and substantially horizontal frames each including stiff metal end and side members having stiffening flanges and the end and side members of each frame being rigidly connected at the corners, the first frame being supported by the axles and its side members lying between two wheels on one axle, and the second frame having transverse end members resting upon and rigidly secured to and supported by the side members of the first frame, and the side members of the second frame lying at least in substantial part in upright planes exterior to the upright planes of the inside of the flanges of the adjacent wheels, together with a central stationary lading bottom at least in part supported by the first frame and lying at least in substantial part below the horizontal plane of the tops of the axle journals, and side lading bodies extending beyond the upright planes of the side members of the first frame, and the said side lading bodies being at least in substantial part supported by the members of the second frame.

27. In mine and similar rail cars, the combination of side sills and end sills rigidly attached and forming a traction truck frame, wheels exterior to the side sills, car axles the centers of whose journals lie in a horizontal plane cutting the side sills, a central lading bottom lying at least in substantial part below the horizontal plane of the tops of the axle journals, transverse stiff load-supporting end wall closure structures at the end of the lading body of the car and each including a cantilever metal transverse structural shape with a stiffening flange, stiff side wall closure and supporting structures each including a longitudinal metal member with a stiffening flange, the said side wall supporting structures being rigidly connected with the ends of the said end wall supporting structures, and the said side wall structures having sufficient stiffness longitudinally to support their loads suitably when supported only at their ends, and side lading bottoms extending beyond the adjacent sills of the traction truck frame in planes cutting the adjacent wheels, the said side lading bottoms having their outer portions supported by means associated with the adjacent side wall supporting structure.

28. In mine and similar rail cars, the combination of side sills and end sills rigidly connected at the corners to form a traction truck frame, wheels, car axles supporting the traction truck frame, a substantially rectangular lading body stiffening and supporting frame itself supported by the side sills of the traction truck frame and secured against movement in respect of the traction truck frame, and the said lading body frame composed at least in part of flanged metal stiffening and supporting members extending substantially from corner to corner of the lading body and fastened securely together, and the said transverse members of the said lading body frame supporting the side members in cantilever fashion, a lading bottom at least in substantial part lying below the horizontal plane of the tops of the axle journals and also below the horizontal plane of the tops of the said side sills, and portions of the said lading bottom extending through the upright planes of the flanges of the adjacent wheels and cutting said flanges, and the said lading bottom extensions being in substantial part below the said plane of the tops of the axle journals and the said bottom extensions being supported at least in substantial part by the side members of the lading body frame.

29. In mine and similar rail cars, the combination of car axles, wheels, a lading bottom lying in substantial part below the horizontal plane of the tops of the car axle journals and the said lading bottoms being supported by the members of two substantially rectangular steel frames, the first frame being narrower than the second and being supported by the car axles and equipped with bumping and coupling means, and the said wider frame lying in a horizontal plane above the first frame and being supported by the longitudinal members of the first frame, and the second frame forming at least a part of the lading body wall stiffening structure.

30. In mine and similar rail cars, the combination of wheels, car axles, stationary lading bottoms lying in substantial part below the horizontal plane of the tops of the car axle journals and the said lading bottoms being supported by the members of two substantially rectangular steel frames, the first frame being narrower than the second and being supported by the car axles and being cut by the horizontal plane of the centers of the journals of the car axles and being equipped with bumping and coupling means, and the second and wider frame lying in a horizontal plane above the first frame and resting upon the longitudinal members of the first frame and secured against movement thereto, and the second frame forming at least part of the lading body wall stiffening structures, and the said lading bottom having portions lying below the upper parts of the longitudinal members of the first frame.

31. In mine and similar rail cars, the combination of wheels, car axles, a central lading bottom lying in substantial part below the horizontal plane of the tops of the axle journals, side lading bodies sealing the edges of the central lading bottom against leakage and extending outwardly beyond the upright planes of the inside flanges of the adjacent car wheels, and the bottoms of the said bodies lying in a plane cutting the adjacent wheel flanges, and the said central and side lading bodies being supported in substantial part by the members of two substantially rectangular steel frames, the first frame being narrower than the second and having its longitudinal side members between two car wheels on one axle and being supported by the car axles and being cut by the horizontal plane of the centers of the car axle journals, and the said wider frame lying in a horizontal plane above the first frame, and longitudinal side sills exterior to the two car wheels on one axle and lying parallel to and substantially in the same horizontal plane as the said longitudinal side members of the first frame, and the said exterior sills in part supporting the lading load.

32. In a mine or similar rail car, the combination of car axles, car wheels, a lading body, a traction truck frame including side sill members and end sill members in the same horizontal plane and rigidly secured at the frame corners, and an additional transverse flanged structural steel member at one end of the lading body of the car which member is above the side sill members and is rigidly fastened to the side sill members whereby it serves as an additional means for preventing the traction truck frame from twisting longitudinally.

33. In a mine or similar rail car, the combination of car axles, car wheels, a traction truck frame including side sills and end sills, a transverse member having an upright web and a horizontal flange, said transverse member being placed above the said side sills and intermediate the ends of said side sills and being rigidly attached to said side sills and serving as a bracing means against longitudinal movement of one side sill relative to the other.

34. In a mine or similar rail car with wing bodies, the combination of a substantially rectangular traction truck frame, a stiff metal beam-member having at least one stiffening flange and extending transversely above and across the said frame intermediate its length and securely fastened to the longitudinal side members of the said frame, said beam-member extending laterally beyond said side members, and a lading-retaining member located outside the said side members of the frame and supported by said beam-member in cantilever fashion.

35. In a mine or similar rail car, the combination of car axles having journals, car wheels, a lading body with side lading walls outside the car-wheels, a substantially rectangular traction truck frame extending above and below the horizontal plane of the centers of the journals of the car axles and having its longitudinal side members located between opposed wheels, a stiff metal beam-member having at least one stiffening flange and extending transversely above and across the said frame intermediate its corners and extending beyond the side members of the frame to serve as a means for supporting the lading body outside the said side members in cantilever fashion, and longitudinal load-supporting metal beam-members running substantially from end to end of the side walls of the lading body, and the said longitudinal beam-members being in rigid relationship with the said stiff metal beam-member.

36. In a mine or similar rail car, the combination of car wheels, car axles having journals and including at least one extension beyond the corresponding wheel, a lading body structure including a lading bottom having at least substantial portions of its lower surface located below the horizontal plane of the journals of the car axles, and a longitudinal metal sill-member supporting the lading body and forming part of its structure and located outside the car wheels and extending above and below the horizontal plane of the tops of the journals of the car axles, and means associating the said axle extension with the said lading body structure whereby the lading body is supported on the said axle and said axle is permitted a downward movement in respect of the lading when the rail beneath the corresponding wheel lies beneath a plane through the rail-engaging surfaces of the other wheels, whereby the chance of derailment of the car on an uneven track is lessened.

37. In a transverse end bumping structure of a mine or similar rail car having a body, the combination of a bumper means with an upright metal wall providing a bumping face and a flange extending substantially horizontally toward the car body, a transverse shock resisting metal member with an upright wall and a flange extending substantially horizontally away from the car body and overreaching the said flange of the said bumper means, a transversely extending cushioning means located between the two said upright walls, securing means having vertical stems extending through apertures in the two said horizontal flanges and the said cushioning means, said stem apertures in at least one of the said metal flanges being of substantially greater dimension longitudinally of the car than the cross section of the stems whereby the cushioning means can yield longitudinally without shearing the said stems.

38. In the transverse end bumping structure of a mine or similar rail car having a body, the combination of a bumper means with an upright metal wall providing a bumping face and a metal flange member extending substantially horizontally toward the car body, a transverse metal means extending substantially horizontally outwardly from the transverse end wall of the car body and overreaching the said flange of the said bumper means, a transversely extending cushioning means located inside the said upright wall of the said bumper means and overreaching said flanges, and a securing means having a vertical stem extending through apertures in the two said horizontal metal members and the said cushioning means, said stem apertures in at least one of the said horizontal metal members being of substantially greater dimension longitudinally of the car than the cross section of the said stem whereby the cushioning means can yield longitudinally without shearing the said stem.

39. In a mine or similar rail car for operating in trains with a lading body having side closure wall structures and lading bottom structures, the combination of car wheels and axles having axle journals; stiff metal side sills with upright webs located between the upright longitudinal planes of the adjacent wheels and of the adjacent side walls, said side sills being sufficiently stiff to support the overhung lading load against end-drooping; end bumper structures passing transversely at the ends of the cars and rigidly fastened to the said side sills; said car wheels having their axes in a horizontal plane cutting the said upright webs of the side sills; said lading body including a central longitudinally extending stationary lading bottom extending between and secured to the side sills with at least portions of the said central lading bottom lying below the horizontal plane of the axes of the car wheels, side lading bottoms lying outside of the oppositely disposed sills with at least the lower portions of the side bottoms lying in planes cutting the adjacent car wheels, and side walls rising from the side lading bottoms for providing side lading bodies which are each approximately rectangular in a transverse cross-section taken between one wheel and the adjacent end closure wall.

40. In a mine or similar rail car for operating in trains with a lading body having side closure wall structures and lading bottom structures, the combination of car wheels and axles having axle journals; stiff metal side sills with upright webs located between the upright longitudinal planes of the adjacent wheels and of the adjacent side walls, said side sills being sufficiently stiff to support the overhung lading load against end-drooping; end bumper structures passing transversely at the ends of the cars and rigidly fastened to the said side sills; said car wheels having their axes in a horizontal plane cutting the said upright webs of the side sills; said lading body including a central longitudinally extending stationary lading bottom extending between and secured to the side sills with at least portions of the said central lading bottom lying below the horizontal plane of the axes of the car wheels, side lading bottoms lying outside of the oppositely disposed sills with at least substantial portions of the side bottoms lying in planes below the axes of the car wheel, and side closure walls extending upwardly from the outside edges of said side lading bottoms.

41. In a mine or similar rail car for operating in trains with a lading body having side closure wall structures and lading bottom structures, the combination of car wheels and axles having axle journals; stiff metal side sills with upright webs located between the upright longitudinal planes of the adjacent wheels and of the adjacent side walls, said side sills being sufficiently stiff to support the overhung lading load against end-drooping; end bumper structures passing transversely at the ends of the cars and rigidly fastened to the said side sills; said car wheels having their axes in a horizontal plane cutting the said upright webs of the side sills; said lading body including a central longitudinally extending stationary lading bottom extending between and secured to the side sills with at least portions of the said central lading bottom lying below the horizontal plane of the axes of the car wheels, side lading bottoms lying outside of the oppositely disposed sills and connected to the side sills substantially at the level of the central lading bottom, and side closure walls extending upwardly from the outside edges of the side lading bottoms whereby low-hung large capacity side lading bodies are obtained in a car of relatively light body construction with at least substantial portions of the side bottoms located below said horizontal plane.

42. In a mine or similar rail car for operating in trains with a lading body having upright side closure wall structures and lading bottom structures, the combination of car wheels and axles having axle journals; stiff metal side sills with upright webs located between the upright longitudinal planes of the adjacent wheels and of the adjacent side walls, said side sills being sufficiently stiff to support the overhung lading load against end-drooping; and bumper structures passing transversely at the ends of the cars and rigidly fastened to the said side sills; said car wheels having their axes in a horizontal plane cutting the said upright webs of the side sills; said lading body including a central longitudinally extending stationary lading bottom extending between and secured to the side sills with at least portions of the said central lading bottom lying below the horizontal plane of the axes of the car wheels, substantially horizontal side lading bottoms lying outside of the oppositely disposed sills located substantially at the level of said central lading bottom, and side walls rising from the side lading bottoms for providing a lading body which is approximately rectangular in a transverse cross-section taken between one wheel and the adjacent end closure wall.

43. In a mine or similar rail car for operating in trains with a lading body having side and end closure wall structures and also having a lading bottom structure, the combination of car wheels and axles with axle journals, means providing a traction truck frame comprising stiff metal side sills with upright webs, said side sills being located outside of oppositely disposed wheels and stiff end sills each substantially perpendicular to and rigidly attached to the side sills and each having as one of its principal stiffening elements a stiff flanged metal transverse sill-means perpendicular to and rigidly attached to the side sills whereby the said frame means of itself and without requiring the reinforcement of elements composing any of the said structures or that may seal any of the said sills with said structures is of sufficient stiffness to endure the haulage and bumping strains and stresses and to support the lading load without harmful end-drooping, said car wheels having their axes in a horizontal plane cutting the said upright webs of the side sills, said lading body including a central longitudinally extending stationary lading bottom extending between and secured to the side sills with at least portions of the said central lading bottom lying below the horizontal plane of the axes of the car wheels, side lading bottoms lying outside of the oppositely disposed sills and connected to the side sills substantially at the level of the central lading bottom, and upright side closure walls extending from the lateral edges of the side lading bottoms whereby low-hung large capacity side lading bodies are obtained in a car of relatively light body construction with at least substantial portions of the side bottoms located below said horizontal plane.

44. In a low-hung, large capacity mine or similar rail car for operating in trains and whereby low-hung large capacity side lading bodies may be obtained in a relatively low car of relatively light body construction, the combination of a lading body having side and end closure wall structures, at least two stiff metal side sills with upright web-portions, the said sills passing longitudinally substantially from end to end of the lading body for supporting the car against end-drooping, car wheels located between the side sills and having axes lying in a horizontal plane cutting the said upright webs of at least two side sills, said body including a lading bottom so located that portions of the lading bottom on both sides of each of the two side sills are at a lower level than the horizontal plane of the tops of the upright webs of the said sills, with the said side sills extending upward into the lading-body section of the car for providing lading space at least outside of said upright webs of the said two sills at the level of the said web portions.

45. In a low-hung, large capacity mine or similar rail car for operating in trains and whereby low-hung large capacity side lading bodies may be obtained in a relatively low car of relatively light body construction, the combination of a lading body having side and end closure wall structures, at least two stiff metal side sills with upright web-portions, the said sills passing longitudinally substantially from end to end of the lading body for supporting the car against end-drooping, car wheels located between the side sills and having axes lying in a horizontal plane cutting the said upright webs of at least two side sills, said body including a lading bottom extending substantially horizontally from side to side and located at a lower level than the horizontal plane of the tops of the upright webs of the said sills, with the said side sills extending upward into the lading-body section of the car for providing lading space at least outside of said upright webs of the said two sills at the level of the said web portions, said side closure walls rising substantially vertically from the lading bottom so that transverse cross-sections of the lading body provided by the lading body and side walls are substantially rectangular for affording a maximum capacity.

46. In a low-hung, large capacity mine or similar rail car for operating in trains and whereby low-hung large capacity side lading bodies may be obtained in a relatively low car of relatively light body construction, the combination of a lading body having side and end closure wall structures, at least two stiff metal side sills with upright web-portions, the said sills passing longitudinally substantially from end to end of the lading body for supporting the car against end-drooping, car wheels located between the side sills and having axes lying in a horizontal plane cutting the said upright webs of at least two side sills, said body including a lading bottom structure extending from side to side of the car and located at a lower level than the horizontal plane of the wheel axes, with the said side sills extending upward into the lading-body section of the car for providing lading space at least outside of said upright webs of the said two sills at the level of the said web portions.

47. In a low-hung, large capacity mine or similar rail car for operating in trains, with low-hung large-capacity side lading bodies in a low car of light body construction, the combination of a lading body having upright side and end closure wall structures, longitudinal stiffening means for supporting the lading body against end-drooping and including at least two side sills extending substantially from end to end of the lading body and located outside oppositely disposed wheels, car wheels located between said side sills and having their axes in a horizontal plane intersecting parts of said longitudinal stiffening means, said lading body including lading bottom portions outside of each of said side sills located at a lower level than the horizontal plane of the tops of the side sills with portions of the lading bottom below the horizontal plane of the car wheel axes.

48. In a mine or similar rail car for operating in trains with a lading body having side closure wall structures and lading bottom structures, the combination of car wheels and axles with axle journals, stiff metal side sills with upright webs, said side sills being located between oppositely disposed wheels, end bumper structures each including a metal member extending from side sill to side sill and rigidly fastened to the said side sills for forming a rigid frame for supporting the lading body against end-drooping and against warping and twisting, said car wheels having their axes in a horizontal plane cutting the said upright webs of the side sills, said bottom structure including a sub-axle central lading bottom, axle support means securely fastened to the car structure between oppositely disposed wheels and having bearing parts for the axles, at least one of the said bearing parts having an axle-receiving space with a greater vertical dimension than the axle so that the axle is permitted a downward movement in respect of the said frame when the rail beneath the corresponding wheel lies below a plane through the rail engaging surfaces of three other wheels for lessening the danger of derailing of the car on an uneven track.

49. In a mine or similar rail car for operating in trains with a lading body having side closure wall structures and lading bottom structures, the combination of car wheels and axles having axle journals, stiff metal side sills with upright webs, said side sills being located outside of oppositely disposed wheels, end bumper structures passing transversely at the ends of the cars and rigidly fastened to the said side sills for forming a rigid frame for supporting the lading body against end-drooping and against warping and twisting, said car wheels having their axes in a horizontal plane cutting the said upright webs of the side sills, said bottom structure including a sub-axle central lading bottom, the side closure wall structures of the lading body having their upper portions laterally spaced outside of said upright web of the adjacent side sill, axle support means having an axle-receiving space with a greater vertical dimension than the axle so that the axle is permitted a downward movement in respect to the lading body structure when the rail beneath the corresponding wheel lies below a plane through the rail engaging surfaces of three other wheels for lessening the danger of derailing of the car on an uneven track.

50. In a mine or similar rail car for operating in trains with a lading body having side closure wall structures and lading bottom structures, the combination of car wheels and axles having axle journals; longitudinal reinforcing members and including side sills with upright webs outside of oppositely disposed wheels; end bumper structures passing transversely at the ends of the cars and rigidly fastened to the said side sills for forming a rigid frame for supporting the lading body against end-drooping and against warping and twisting; said car wheels having their axes in a horizontal plane cutting the said upright webs of the side sills; said bottom structure including a sub-axle central lading bottom, each side closure wall structure of the lading body having its upper portion laterally spaced outside of said upright web of the adjacent side sill, axle support means securely fastened to the said sills, at least one of said axle support means having an aperture for receiving the corresponding axle, said aperture having a greater vertical dimension than the axle so that the axle is permitted a downward movement in respect to the lading body structure when the rail beneath the corresponding wheel lies below a plane through the rail-engaging surfaces of three other wheels, for lessening the danger of derailing of the car on an uneven track.

51. In a mine or similar rail car for operating in trains with a lading body having side closure wall structures and lading bottom structures, the combination of car wheels and axles having axle journals; longitudinal reinforcing members including side sills being located outside of oppositely disposed wheels; end bumper structures passing transversely at the ends of the cars and rigidly fastened to the said side sills for forming a rigid frame for supporting the lading body against end-drooping and against warping and twisting; said reinforcing members also including upright web portions and said car wheels having their axes in a horizontal plane cutting the said upright webs; said bottom structure including a sub-axle central lading bottom, each side closure wall structure of the lading body having its upper portion laterally spaced outside of the adjacent side sill, axle support means securely fastened to the said sills, at least one of said axle support means having an aperture for receiving the corresponding axle, said aperture having a greater vertical dimension than the axle so that the axle is permitted a downward movement in respect to the lading body structure when the rail beneath the corresponding wheel lies below a plane through the rail-engaging surfaces of three other wheels, for lessening the danger of derailing of the car on an uneven track.

52. In a mine or similar rail car for operating in trains with a lading body having side closure wall structures and lading bottom structures, the combination of car wheels and axles having axle journals, stiff metal side sills with upright webs, said side sills being located outside of oppositely disposed wheels, end bumper structures passing transversely at the ends of the cars and rigidly fastened to the said side sills for forming a rigid frame for supporting the lading body against end-drooping and against warping and twisting, said car wheels having their axes in a horizontal plane cutting the said upright webs of the side sills, said bottom structure including a sub-axle central lading bottom and wing lading bottoms, the wing lading bottoms having rear lading-receiving portions behind the rearward wheels, said rear portions being located at a lower level than the horizontal plane through the wheel axes, said sills being located at least in part above the said rear portions and above an adjacent portion of the central bottom so that they extend into the lading body space, the side closure wall structures of the lading body having their upper portions laterally spaced outside of said upright web of the adjacent side sill, axle support means securely fastened to the said sills, at least one of said axle support means having an axle-receiving space with a greater vertical dimension than the axle so that the axle is permitted a downward movement in respect to the lading body structure when the rail beneath the corresponding wheel lies below a plane through the rail engaging surfaces of three other wheels for lessening the danger of derailing of the car on an uneven track.

53. In a mine or similar rail car, means providing a lading body including side closure walls, longitudinal reinforcing means for the lading body including side sills for supporting the ends of the body against end-drooping and other stiffening members spaced from the side sills, car wheels and axles, said lading body including a lading bottom having portions located below the horizontal plane of the wheel axes, said reinforcing means including parts above and below said horizontal plane, and axle supporting means including parts attached to said reinforcing means at spaced points along each axle, said supporting means being effective for transmitting the weight of the car and its contents through the axles and wheels to the rails on an even track and having at least one aperture for receiving each axle so that a wheel may drop when the car passes over an uneven track whereby to lessen the chance of derailment.

54. In a mine or similar rail car, the combination of car wheels, car axle journals, a central lading body portion extending longitudinally of the car, side lading wing-body portions extending longitudinally of the car and each wing-body having upright side closure walls and wing lading bottoms whose top surfaces directly rearward longitudinally of the most rearward adjacent car wheel lie below the horizontal plane of the top of said wheel, and means providing a wheel hood extending from said low portion of the bottom of the lading wing-body upward over the top of the said adjacent wheel, metal side sills located outside oppositely disposed car wheels and extending longitudinally of the lading body substantially to its ends, the said sills being located inside the upright side closure walls, the said central lading body portion including a metal lading bottom lying at least in substantial part below the horizontal plane of the axes of the car wheels, and axle boxings rigidly secured to the side sills.

55. In the end bumping and coupling structure of a mine or similar rail car, the combination of a bump-receiving member, two horizontal metal members overlapping each other in adjacent horizontal planes, one of said members being connected to the bump-receiving member for receiving therefrom a force tending to move it longitudinally of the other member when the bumping occurs, yielding cushioning means permitting the longitudinal movement of one of said members relative to the other when the car is enduring bumping strains, and securing means having vertical stems passing through apertures in one of the said members and also having portions at the level of the other said member, said apertures in at least one of the said metal plate members being of substantially greater dimension longitudinally of the car than the longitudinal cross section of the said securing means in the same horizontal plane so that the cushioning means can yield and the two metal plate members move longitudinally relative to each other corresponding to such yielding without tending to shear or harmfully bend the said securing means.

56. In the end bumping and coupling structure of a mine or similar rail car, the combination of a bump-receiving member, two horizontal metal members overlapping each other in adjacent horizontal planes, one of said members being connected to the bump-receiving member for receiving therefrom a force tending to move it longitudinally of the other member when the bumping occurs, wooden cushioning means permitting the longitudinal movement of one of said members relative to the other when the car is enduring bumping strains, the other metal member being rigidly secured to said cushioning means, and securing means having vertical stems passing through apertures in one of the said members and also having portions at the level of the other member, said apertures in each of the said metal plate members being of substantially greater dimension longitudinally of the car than the longitudinal cross section of the said securing means in the same horizontal plane so that the cushioning means can yield and the two metal plate members move longitudinally relative to each other corresponding to such yielding without tending to shear or harmfully bend the said securing means.

57. In the end bumping and traction structure of a mine or similar rail car, the combination of an apertured heavy transverse wood beam for resisting and cushioning bumps, a metal upright bumping face member engaged with the wood beam, a top metal plate lying in a horizontal plane and bolted to the said wood beam, a draw bar element extending in a horizontal plane above the said top metal plate and having an aperture for a coupling pin, a vertical coupling pin closely fitting the said aperture and passing down through the said top metal plate and also into an aperture in the said wood beam, and the aperture in the said top plate being of substantially greater dimension longitudinally of the car than the longitudinal cross section of the portion of the coupling pin located in said plate aperture whereby the said top plate can move longitudinally in respect of the said draw bar element while the said wood beam is yielding for cushioning a bump when the car is enduring bumping stresses without harmful shearing or bending of the said coupling pin.

58. In the end bumping structure of a mine car, the combination of a cushioning means that yields longitudinally of the car when the car is enduring pushing and pulling strains, two metal members located in guiding contact with each other in a horizontal plane, one of the said members being attached to the said cushioning means and moving longitudinally in correspondence with the longitudinal yielding of the said means, and the other said member being rigidly attached to the more unyielding car structure, and metal connecting means with a stem snugly fitting an aperture in one of said members and the said means projecting through the said horizontal plane, the other said member having a slot which is longer longitudinally than the longitudinal dimension of the said projecting part of the said means whereby the longitudinal movement of the said members relative to each other can take place during the yielding of the cushioning means without shearing or harmfully distorting the said connecting means.

59. In the end bumping and traction structure of a mine or similar rail car, the combination of an apertured heavy transverse wood beam for resisting and cushioning bumps, a metal upright bumping face member engaged with the wood beam, a draw bar element extending in a horizontal plane above the said wood beam and having an aperture for a coupling pin, a vertical coupling pin closely fitting the said aperture and passing down through an aperture in the said wood beam, the aperture in the wood beam being of substantially greater dimension longitudinally of the car than the longitudinal cross section of the portion of the coupling pin located in said beam aperture whereby the said wood beam can yield longitudinally in respect of the said draw bar element for cushioning a bump when the car is enduring bumping stresses without harmful shearing or bending of the said coupling pin.

60. In the end bumping and traction structure of a mine or similar rail car, the combination of an apertured heavy transverse wood beam for resisting and cushioning bumps, a metal upright bumping face member engaged with the wood beam, a top metal plate lying in a horizontal plane and bolted to the said wood beam, a draw bar element extending in a horizontal plane above the said top metal plate and having an aperture for a coupling pin, a vertical coupling pin closely fitting the said aperture and passing down through the said top metal plate and also into an aperture in the said wood beam, the apertures in the said top plate and wood beam being of substantially greater dimension longitudinally of the car than the longitudinal cross section of the portion of the coupling pin located in said plate aperture whereby the said top plate can move longitudinally and the wood beam can yield in respect of the said draw bar element while the said wood beam is yielding for cushioning a bump when the car is enduring bumping stresses without harmful shearing or bending of the said coupling pin.

61. In mine and other rail cars the combination of rigid flanged longitudinal metal side sills which, of themselves and independently of the reinforcements of the other elements of the lading body structure of the car, are sufficiently stiff to support the lading load without harmful end drooping, car wheels; a central lading bottom having at least substantial portions lying below the horizontal plane of the axes of the car wheels; wing lading bodies outside of adjacent side sills and into which the tops of the car wheels project and including side closure walls located outside the adjacent side sills, and wheel hoods extending over the tops of the car wheels; transverse metal beams separate from the wheel hoods extending transversely of the lading body intermediate the end closure walls of the lading body, the said transverse beams being supported by the side sills whereby the lading wing-bodies are supported at least in part in cantilever fashion between the ends of the lading body structure, and longitudinal flanged metal beams in supported relationship with said transverse beams for supporting the end portions of the lading wing-bodies at least in part in cantilever fashion.

62. In mine and other rail cars the combination of rigid flanged longitudinal metal side sills which, of themselves and independently of the reinforcements of the other elements of the lading body structure of the car, are sufficiently stiff to support the lading load without harmful end drooping; car wheels; a central lading bottom having at least substantial portions lying below the horizontal plane of the axes of the car wheels; wing lading bodies outside of adjacent side sills and into which the tops of the car wheels project and including side closure walls located outside the adjacent side sills, and wheel hoods extending over the tops of the car wheels; transverse metal beams located above the axles and separate from the wheel hoods extending transversely of the lading body intermediate the end closure walls of the lading body, the said transverse beams being supported by the side sills whereby the lading wing-bodies are supported at least in part in cantilever fashion between the ends of the lading body structure, and longitudinal flanged metal beams in supported relationship with said transverse beams for supporting the end portions of the lading wing-bodies at least in part in cantilever fashion.

63. In a mine or similar rail car, the combination of means providing a lading body having upright side closure walls at the extreme outside of the lading body, longitudinal metal stiffening means for said lading body located between the upright planes of the said side closure walls and including side sills, members spaced from said side sills and having upright walls extending longitudinally of the lading body, car wheels and axles, said wheels each being located between a side sill and the said member adjacent such side sill, the plane of the wheel axes intersecting the side sills, axle guiding and supporting means located outside the corresponding wheels and rigidly attached to the lading body structure and effective for permitting the wheel to move downward when the car is passing over an uneven track.

64. In a mine car, the combination of car wheels, axles, longitudinal side sills oppositely disposed and supported by the axles, a central lading body lying at least in substantial part below the horizontal plane of the axes of the car wheels, lading bodies outside of oppositely disposed side sills, the plane of the wheel axes intersecting the side sills and at least one transverse cantilever beam located at one end of the car structure and passing continuously from one side sill to the other and supported by each of the side sills and extending laterally beyond each of said side sills for supporting the side lading bodies at least in substantial part in cantilever fashion.

65. In mine or other cars, the combination of metal end and side sills secured together for forming a traction truck frame, a metal lading bottom secured to the lower portions of the said side sills, together with sheet metal end sill bracing members secured to the end and side sills and having portions with outer diagonal edges, and the said portions having substantially upright flanges fastened rigidly to the said end and side sills.

66. In a mine or similar rail car, the combination of means providing a lading body structure with side closure walls having substantially upright portions at the extreme outside of the lading body, stiff metal longitudinal side sills located between the upright planes of the said upright portions of the said side closure walls, car wheels and axles, the plane of the wheel axes intersecting said side sills, said lading body including a lading bottom having at least substantial portions located below the horizontal plane of the axes of the car wheels, an axle guiding means located outside a car wheel and rigidly secured to the lading body structure in guiding relationship with the one end of a car axle for permitting a restricted free downward movement of the wheel and axle in respect of the lading body structure and for restricting the axle at the upper and lower limits of said free movement, so that a raising of the wheel from its lowermost position may be accomplished without overcoming any resistance of any member constituting a part of the car and without exerting a lifting effort upon such a member.

67. In the transverse end bumping structure of a mine or similar rail car having a body and an end member including a metal portion extending horizontally away from the body, the combination of a metal bumper member having an upright wall providing a bumping face and a horizontal portion directed toward the car body and overlapping said member, said portions having vertical aligned apertures, upright securing means for at least one of said horizontal portions and having vertical stems passing through apertures in the corresponding horizontal portion, one said securing means also having other parts at the level of the other said portion, said bumper member telescoping with respect to said end member, at least one aperture in the other said portion being a slot extending longitudinally of the car for receiving said other part of a securing means whereby said telescoping may occur without shearing the corresponding securing means, and cushioning means for resisting said telescoping.

68. In mine and similar rail cars, the combination of car wheels, car axles, longitudinal metal side sills supported by the axles, a central lading body lying between two car wheels on one axle and having an end closure wall, side lading bodies extending beyond the inside flanges of the adjacent wheels, a transverse stiff metal means adjacent said end closure wall and supported from the side sills independently of the end wall and connected to the side sills and at least in substantial part supporting the corresponding end of each of the said side lading bodies in cantilever fashion.

69. In a mine or similar rail car having side sills, the combination of transverse car axles, car wheels, and means providing therewith a lading body supported from the axles, said means including substantially upright outside longitudinal side closure walls, the side sills being laterally spaced from said side closure walls, at least one side of the car having a longitudinal steel member with sidewise projecting stiffening means, and supporting means for said steel member located adjacent the upright planes of the transverse car axles, said steel member being located outside the wheels and spaced from and inside the side closure wall on the corresponding side of the car and fastened to the car structure thereat and acting at least in part as a means for supporting in cantilever fashion the lading in the car beyond said upright planes of the car axles, said supporting means including a transverse cantilever member supported by the longitudinal steel member and extending laterally beyond the same in supporting relation to the said lading body portion.

70. In a mine or similar rail car, the combination of a lading body, car wheels and axles; said lading body including a central lading bottom extending lengthwise of the car and located at least in substantial part below the horizontal plane of the axes of the car wheels, and side lading body portions located outside the car wheels and each having a substantially upright part which constitutes an outside longitudinal side closure wall for the lading body; spaced longitudinal metal side sills with sidewise projecting stiffening portions, each of said side sills being cut by the said horizontal plane and each having an upright wall located between and spaced from the planes of said oppositely disposed upright parts of the side closure walls, a longitudinal steel member having an upright portion located outside the car wheels at one side of the car and having sidewise-projecting stiffening portions, means for supporting the said longitudinal steel member relative to the car axles substantially at the upright transverse planes of the axes of the car wheels, and the said longitudinal member extending between and beyond said transverse upright planes for supporting the lading load in the ends of the car and for resisting end drooping of the car body.

71. In a mine or similar rail car, the combination of a lading body, car wheels and axles; said lading body including a central lading bottom extending lengthwise of the car and located at least in substantial part below the horizontal plane of the axes of the car wheels, and lading body portions located outside the car wheels and each having a substantially upright part which constitutes an outside longitudinal side closure wall for the lading body; spaced longitudinal metal side sills with sidewise-projecting stiffening portions, each of said side sills being cut by the said horizontal plane and each having an upright wall located between and spaced from the planes of said oppositely disposed upright parts of the side closure walls, a longitudinal steel member having an upright portion located outside the adjacent car wheels and having sidewise-projecting stiffening portions, means for supporting the said longitudinal steel member relative to the car axles substantially at the upright transverse planes of the axes of the car wheels, and the said longitudinal member extending continuously from one of the said upright planes to the other and also extending beyond the two said upright planes and terminating short of the ends of the lading body of the car, said longitudinal steel member being constructed and effective as longitudinal cantilever means to prevent the car body from end drooping and to prevent the car structure from buckling between the said two transverse upright planes.

SANFORD INVESTMENT COMPANY,
By HUGH W. SANFORD,
*President.*
*Assignee of Audley Hart Stow, deceased.*

DISCLAIMER

Re. 20,591.—*Audley Hart Stow*, deceased, late of Charleston, W. Va., by *Sanford Investment Co.*, assignee. SIDEWISE DUMPING MINE CAR AND THE LIKE. Patent dated December 14, 1937. Disclaimer filed April 23, 1942, by the assignee, *Sanford Investment Company*.

Hereby enters this disclaimer to claims 1, 2, 4, 6, 7, 8, 9, 10, 11, 12, 14, 16, 23, 29, 32, 33, 35, 36, 38, 39, 40, 41, 42, 45, 48, 49, 50, 51, 52, 53, 54, 55, 56, 57, 58, 61, 62, 63, 66, 67, and 68 in said specification.

[*Official Gazette June 2, 1942.*]

DISCLAIMER

Re. 20,591.—*Audley Hart Stow*, deceased, late of Charleston, W. Va., by *Sanford Investment Co.*, assignee. SIDEWISE DUMPING MINE CAR AND THE LIKE. Patent dated December 14, 1937. Disclaimer filed December 8, 1942, by the assignee, *Sanford Investment Company*.

Hereby enters this disclaimer to claims 13, 17, 18, 19, 20, 21, 22, 27, 34, 60, and 64 in said specification.

[*Official Gazette January 5, 1943*]